US008712835B1

(12) United States Patent  
Philyaw et al.

(10) Patent No.: US 8,712,835 B1  
(45) Date of Patent: Apr. 29, 2014

(54) METHOD AND APPARATUS FOR LINKING A WEB BROWSER LINK TO A PROMOTIONAL OFFER

(75) Inventors: Jeffry Jovan Philyaw, Dallas, TX (US); David Kent Mathews, Carrollton, TX (US)

(73) Assignee: RPX Corporation, San Francisco, CA (US)

(*) Notice: Subject to any disclaimer, the term of this patent is extended or adjusted under 35 U.S.C. 154(b) by 0 days.

(21) Appl. No.: 09/382,377

(22) Filed: Aug. 24, 1999

Related U.S. Application Data

(63) Continuation-in-part of application No. 09/378,221, filed on Aug. 19, 1999, now Pat. No. 6,745,234, which is a continuation-in-part of application No. 09/151,471, filed on Sep. 11, 1998, now abandoned, and a continuation-in-part of application No. 09/151,530, filed on Sep. 11, 1998, now Pat. No. 6,098,106.

(51) Int. Cl.  
*G06Q 30/00* (2012.01)

(52) U.S. Cl.  
USPC .............. 705/14.1; 705/14.49; 705/14.73; 705/14.53; 705/14.4; 709/219; 709/218; 709/238

(58) Field of Classification Search  
USPC ...................................... 705/14, 14.1–14.73  
See application file for complete search history.

(56) References Cited

U.S. PATENT DOCUMENTS

| | | | |
|---|---|---|---|
| 3,668,312 A | 6/1972 | Yamamoto et al. | 178/6.8 |
| 4,002,886 A | 1/1977 | Sundelin | 235/61.7 R |
| 4,042,792 A | 8/1977 | Pakenham et al. | 179/90 |
| 4,365,148 A | 12/1982 | Whitney | 235/383 |
| 4,621,259 A | 11/1986 | Schepers et al. | 340/707 |
| 4,654,482 A | 3/1987 | DeAngelis | 379/95 |
| 4,780,599 A | 10/1988 | Baus | 235/383 |
| 4,785,296 A | 11/1988 | Tabata et al. | 340/731 |
| 4,816,904 A | 3/1989 | McKenna et al. | 358/84 |
| 4,817,136 A | 3/1989 | Rhoads | 379/357 |
| 4,833,308 A | 5/1989 | Humble | 235/383 |
| 4,841,132 A | 6/1989 | Kajitani et al. | 235/472 |

(Continued)

FOREIGN PATENT DOCUMENTS

| | | | |
|---|---|---|---|
| EP | 0 961 250 A2 | 12/1999 | G07F 19/00 |
| WO | WO 95/10813 | 10/1994 | G06F 15/403 |

(Continued)

OTHER PUBLICATIONS

"Inexpensive set-top boxes unleash Internet TV", Japan Times (XAO) Sep. 10, 1998 p. 8 , dialog file 583, # 06689158.*

(Continued)

*Primary Examiner* — Khanh H Le  
(74) *Attorney, Agent, or Firm* — Howison & Arnott, L.L.P.

(57) ABSTRACT

A method for offering a promotion to a user. A stimulus is received from a broadcast directed to a user location, the stimulus having unique coded information encoded therein. The unique coded information is extracted from the stimulus by decoding this information. From the decoded information, there is determined routing information for routing over a network to a promotion location on the network, which promotion location is operable to offer a promotion. The promotion location on the network is then interconnected in accordance with the determined routing information. A promotion is then offered over the network in response to the interconnection thereof by the step of interconnecting.

8 Claims, 12 Drawing Sheets

(56) References Cited

U.S. PATENT DOCUMENTS

| | | | | |
|---|---|---|---|---|
| 4,845,634 A | 7/1989 | Vitek et al. ............... 364/468 |
| 4,894,789 A | 1/1990 | Yee ............................ 364/521 |
| 4,899,370 A | 2/1990 | Kameo et al. ............. 379/104 |
| 4,901,073 A | 2/1990 | Kibrick ........................ 341/13 |
| 4,905,094 A | 2/1990 | Pocock et al. ............. 358/342 |
| 4,907,264 A | 3/1990 | Seiler et al. ................ 379/355 |
| 4,916,293 A | 4/1990 | Cartlidge et al. .......... 235/375 |
| 4,937,853 A | 6/1990 | Brule et al. .................. 379/96 |
| 4,947,028 A | 8/1990 | Gorog ......................... 235/381 |
| 4,959,530 A | 9/1990 | O'Connor ................... 235/383 |
| 4,975,948 A | 12/1990 | Andresen et al. .......... 379/355 |
| 4,984,155 A | 1/1991 | Geier et al. ................. 364/401 |
| 5,038,023 A | 8/1991 | Saliga ......................... 235/385 |
| 5,054,096 A | 10/1991 | Beizer .......................... 382/41 |
| 5,088,045 A | 2/1992 | Shimanaka et al. ....... 364/468 |
| 5,111,391 A | 5/1992 | Fields et al. ............... 364/401 |
| 5,115,326 A | 5/1992 | Burgess et al. ............ 358/440 |
| 5,128,752 A | 7/1992 | Von Kohorn ................ 358/84 |
| 5,144,654 A | 9/1992 | Kelley et al. .............. 379/356 |
| 5,161,037 A | 11/1992 | Saito ........................... 358/468 |
| 5,161,214 A | 11/1992 | Addink et al. ............. 395/145 |
| 5,182,705 A | 1/1993 | Barr et al. .................. 364/401 |
| 5,189,630 A | 2/1993 | Barstow et al. ............ 364/514 |
| 5,191,525 A | 3/1993 | LeBrun et al. ............. 364/419 |
| 5,198,644 A | 3/1993 | Pfeiffer et al. ............. 235/383 |
| 5,235,654 A | 8/1993 | Anderson et al. ........... 382/61 |
| 5,241,402 A | 8/1993 | Aboujaoude et al. ..... 358/406 |
| 5,243,531 A | 9/1993 | DiPippo et al. ............ 364/468 |
| 5,247,347 A | 9/1993 | Litteral et al. ............... 358/85 |
| 5,262,860 A * | 11/1993 | Fitzpatrick et al. ......... 348/461 |
| 5,285,278 A | 2/1994 | Holman ...................... 358/142 |
| 5,287,181 A | 2/1994 | Holman ...................... 348/473 |
| 5,288,976 A | 2/1994 | Citron et al. ............... 235/375 |
| 5,296,688 A | 3/1994 | Hamilton et al. .......... 235/375 |
| 5,304,786 A | 4/1994 | Pavlidis et al. ............ 235/462 |
| 5,305,195 A | 4/1994 | Murphy ...................... 364/401 |
| 5,319,454 A | 6/1994 | Schutte ........................ 348/5.5 |
| 5,324,922 A | 6/1994 | Roberts ...................... 235/375 |
| 5,331,547 A | 7/1994 | Laszlo .................... 364/413.01 |
| 5,340,966 A | 8/1994 | Morimoto ................... 235/376 |
| 5,357,276 A | 10/1994 | Banker et al. ................. 348/7 |
| 5,362,948 A | 11/1994 | Morimoto ................... 235/376 |
| 5,382,779 A | 1/1995 | Gupta ......................... 235/383 |
| 5,386,298 A | 1/1995 | Bronnenberg et al. ..... 358/403 |
| 5,398,336 A | 3/1995 | Tantry et al. ............... 395/600 |
| 5,405,232 A | 4/1995 | Lloyd et al. ................ 414/280 |
| 5,418,713 A | 5/1995 | Allen .......................... 364/403 |
| 5,420,403 A | 5/1995 | Allum et al. ............... 235/375 |
| 5,420,943 A | 5/1995 | Mak ............................ 382/313 |
| 5,424,524 A | 6/1995 | Ruppert et al. ............ 235/462 |
| 5,438,355 A | 8/1995 | Palmer .......................... 348/1 |
| 5,446,490 A | 8/1995 | Blahut et al. ................... 348/7 |
| 5,446,919 A | 8/1995 | Wilkins ....................... 455/6.2 |
| 5,491,508 A | 2/1996 | Friedell et al. ............... 348/16 |
| 5,493,107 A | 2/1996 | Gupta et al. ................ 235/383 |
| 5,519,878 A | 5/1996 | Dolin, Jr. .................... 395/800 |
| 5,530,852 A | 6/1996 | Meske, Jr. et al. ......... 396/600 |
| 5,570,295 A | 10/1996 | Isenberg et al. ............ 364/514 |
| 5,572,643 A | 11/1996 | Judson ........................ 395/793 |
| 5,592,551 A | 1/1997 | Lett et al. ..................... 380/20 |
| 5,594,226 A | 1/1997 | Steger ......................... 235/379 |
| 5,602,377 A | 2/1997 | Beller et al. ................ 235/462 |
| 5,604,542 A | 2/1997 | Dedrick ...................... 348/552 |
| 5,640,193 A | 6/1997 | Wellner ......................... 348/7 |
| 5,649,186 A | 7/1997 | Ferguson .................... 395/610 |
| 5,664,110 A | 9/1997 | Green et al. .................. 705/26 |
| 5,671,282 A | 9/1997 | Wolff et al. .................. 380/25 |
| 5,675,721 A | 10/1997 | Freedman et al. ......... 395/129 |
| 5,682,540 A | 10/1997 | Klotz, Jr. et al. ........... 395/766 |
| 5,694,163 A | 12/1997 | Harrison ....................... 348/13 |
| 5,708,780 A | 1/1998 | Levergood et al. .... 395/200.12 |
| 5,710,887 A | 1/1998 | Chelliah et al. ............ 395/226 |
| 5,715,314 A | 2/1998 | Payne et al. .................. 380/24 |
| 5,724,424 A | 3/1998 | Gifford ......................... 380/24 |
| 5,745,681 A | 4/1998 | Levine et al. ............ 395/200.3 |
| 5,754,906 A | 5/1998 | Yoshida ...................... 396/448 |
| 5,757,917 A | 5/1998 | Rose et al. ................... 380/25 |
| 5,761,606 A | 6/1998 | Wolzien ....................... 455/6.2 |
| 5,764,906 A | 6/1998 | Edelstein et al. ........ 395/200.49 |
| 5,765,176 A | 6/1998 | Bloomberg ................. 707/514 |
| 5,768,508 A * | 6/1998 | Eikeland |
| 5,768,528 A | 6/1998 | Stumm .................... 395/200.61 |
| 5,774,664 A | 6/1998 | Hidary et al. ............... 395/200 |
| 5,774,870 A | 6/1998 | Storey .......................... 705/14 |
| 5,778,367 A | 7/1998 | Wesinger, Jr. et al. .......... 707/10 |
| 5,790,793 A | 8/1998 | Higley .................... 395/200.48 |
| 5,791,991 A | 8/1998 | Small ............................ 463/41 |
| 5,794,210 A | 8/1998 | Goldhaber et al. ........... 705/14 |
| 5,796,952 A | 8/1998 | Davis et al. ............. 305/200.54 |
| 5,804,803 A | 9/1998 | Cragun et al. .............. 235/375 |
| 5,815,776 A | 9/1998 | Nukada ....................... 399/174 |
| 5,818,935 A * | 10/1998 | Maa .............................. 380/20 |
| 5,832,223 A * | 11/1998 | Hara et al. |
| 5,833,468 A | 11/1998 | Guy et al. ................... 434/350 |
| 5,848,202 A | 12/1998 | D'Eri et al. ................. 382/306 |
| 5,848,413 A | 12/1998 | Wolff ............................ 707/10 |
| 5,854,897 A | 12/1998 | Radziewicz et al. ......... 709/224 |
| 5,864,823 A | 1/1999 | Levitan ......................... 105/14 |
| 5,869,819 A * | 2/1999 | Knowles et al. ............. 235/375 |
| 5,905,248 A | 5/1999 | Russell et al. .............. 235/462 |
| 5,905,251 A | 5/1999 | Knowles .................. 235/472.01 |
| 5,905,665 A | 5/1999 | Rim ............................ 364/746 |
| 5,905,865 A | 5/1999 | Palmer et al. ........... 395/200.47 |
| 5,907,793 A | 5/1999 | Reams .......................... 455/3.1 |
| 5,913,210 A * | 6/1999 | Call ................................ 707/4 |
| 5,915,090 A | 6/1999 | Joseph et al. ............... 709/202 |
| 5,918,214 A | 6/1999 | Perkowski .................... 705/27 |
| 5,923,735 A * | 7/1999 | Swartz et al. ............. 379/93.12 |
| 5,925,865 A | 7/1999 | Steger ......................... 235/379 |
| 5,929,850 A | 7/1999 | Broadwin et al. .......... 345/327 |
| 5,932,863 A | 8/1999 | Rathus et al. ........... 235/462.15 |
| 5,933,829 A | 8/1999 | Durst et al. ................... 707/10 |
| 5,948,061 A * | 9/1999 | Merriman et al. .......... 709/219 |
| 5,950,173 A * | 9/1999 | Perkowski .................... 705/26 |
| 5,957,695 A | 9/1999 | Redford et al. .......... 434/307 R |
| 5,960,411 A | 9/1999 | Hartman et al. .............. 705/26 |
| 5,961,603 A * | 10/1999 | Kunkel et al. .............. 709/229 |
| 5,970,469 A * | 10/1999 | Scroggie et al. ............. 705/14 |
| 5,970,471 A | 10/1999 | Hill .............................. 705/26 |
| 5,970,472 A | 10/1999 | Allsop et al. ................. 705/26 |
| 5,971,277 A | 10/1999 | Cragun et al. .......... 235/462.01 |
| 5,974,443 A | 10/1999 | Jeske .......................... 709/202 |
| 5,974,451 A | 10/1999 | Simmons .................... 709/218 |
| 5,976,833 A | 11/1999 | Furukawa et al. .......... 435/69.1 |
| 5,978,773 A * | 11/1999 | Hudetz et al. ................ 705/23 |
| 5,991,739 A | 11/1999 | Cupps et al. ................. 705/26 |
| 5,992,752 A | 11/1999 | Wilz, Sr. et al. ........ 235/472.01 |
| 5,995,105 A | 11/1999 | Reber et al. ................ 345/356 |
| 6,002,394 A | 12/1999 | Schein et al. ............... 345/327 |
| 6,003,073 A | 12/1999 | Solvason .................... 709/219 |
| 6,006,257 A | 12/1999 | Slezak ........................ 709/219 |
| 6,009,410 A * | 12/1999 | LeMole et al. ........... 705/14.54 |
| 6,009,465 A | 12/1999 | Decker et al. ............... 709/219 |
| 6,012,102 A * | 1/2000 | Shachar ......................... 710/5 |
| 6,018,764 A | 1/2000 | Field et al. .................. 709/217 |
| 6,049,539 A | 4/2000 | Lee et al. .................... 370/355 |
| 6,061,719 A * | 5/2000 | Bendinelli et al. ......... 709/218 |
| 6,064,979 A | 5/2000 | Perkowski .................... 705/26 |
| 6,101,483 A * | 8/2000 | Petrovich et al. ............ 705/26 |
| 6,108,656 A * | 8/2000 | Durst et al. ................... 707/10 |
| 6,330,595 B1 * | 12/2001 | Ullman et al. .............. 709/219 |
| 6,338,094 B1 | 1/2002 | Scott et al. .................. 709/245 |
| 6,386,453 B1 * | 5/2002 | Russell et al. .......... 235/462.01 |
| 6,487,538 B1 | 11/2002 | Gupta et al. ................. 705/14 |
| 6,542,933 B1 * | 4/2003 | Durst, Jr. et al. ........... 709/229 |
| 6,625,581 B1 * | 9/2003 | Perkowski .................... 705/27 |
| 6,753,883 B2 * | 6/2004 | Schena et al. ............... 715/741 |
| 6,785,659 B1 * | 8/2004 | Landsman et al. ........... 705/14 |
| 7,543,323 B1 * | 6/2009 | Zigmond et al. ............. 725/51 |
| 2003/0093384 A1 * | 5/2003 | Durst et al. ................... 705/64 |

(56) References Cited

U.S. PATENT DOCUMENTS

FOREIGN PATENT DOCUMENTS

| WO | WO 96/07146 | 9/1995 | ............. G06F 17/00 |
|---|---|---|---|
| WO | WO 97/37319 | 2/1997 | ............. G06K 7/10 |
| WO | WO 98/09243 | 8/1997 | ............. G06F 19/00 |
| WO | WO 97/33434 | 9/1997 | ............. H04N 7/00 |
| WO | WO-97/33434 A1 * | 9/1997 | ............. H04N 7/00 |
| WO | WO 98/03923 | 1/1998 | ............. G06F 15/163 |
| WO | WO 98/06055 | 2/1998 | ............. G06F 163/00 |
| WO | WO 98/19259 | 5/1998 | ............. G06F 17/60 |
| WO | WO 98/40823 | 9/1998 | ............. G06F 13/00 |
| WO | WO 98/53611 | 11/1998 | ............. H04N 7/173 |
| WO | WO 99/15968 | 4/1999 | ............. G06F 12/00 |
| WO | WO 99/63457 | 6/1999 | ............. G06F 17/30 |
| WO | WO 99/38321 | 7/1999 | ............. H04N 5/445 |
| WO | WO 00/56072 | 9/2000 | ............. H04N 7/16 |

OTHER PUBLICATIONS

"PBS to transmit Web pages via TV signals—Web pages catch a ride on TV broadcasts" by Andrews, Whit, WebWeek, Apr. 2 1997, v3 n12 p. 27, Dialog File 233, #00456769.*

"It's s not interactive TV, but it's close enough" by Carl, Jeremy, WebWeek, Dec. 1, 1995, v1 n8 p. 39, Dialog File 233, #00405621.*

"Group Decision Support System: Development and Application", Energy Systems, Westinghouse, Pittsburgh, PA.

"New Technologies in Credit Card Authentication", Pieter de Bryne, Institute for Communications Technology, Zurich, Switzerland.

"AVITAL, a Private Teaching System by Fax Communication", Atsusji Iizawa, Noriro Sugiku, Yukau Shitora and Hideko Kunji, Software Research Center, Tokyo, Japan.

"Document on Computer" USPS Technical Support Center, Norman, OK.

"Development of a Commercially Successful Wearable Data Collection System", Symbol Technologies, Inc.

What do forward looking companies consider in their plans and developments?, A.G. Johnston, Nestle.

"The Automation Synergy", Neves and Noivo, Portugal.

"Integration of Hand-Written Address Interpretation Technology into the United States Postal Service Remote Computer Reader System", Srihari (CEDAR, SUNY at Buffalo) and Kueberg (U.S. Postal Service, VA).

"Paper Based Document Security—A Review", van Renesse, TNO Institute of Applied Physics, The Netherlands.

"IEEE Standard for Bar Coding for Distribution Transformers" Transformers Committee of the IEEE Power Engineering Society, The Institute of Electrical and Electronics Engineers, Inc. NY.

"The Stylus™-Shopping from Home", STYLUS Innovation, MA.

"Distributing Uniform Resource Locators as Bar Code Images", IBM Technical Disclosure Bulleting, Jan. 1996.

"Bar Code Method for Automating Catalog Orders", IBM Technical Disclosure Bulletin, Sep. 1998.

"Bar-Code Recognition System Using Image Processing", Kuroki, Yoneoka et al., Hitachi Research Laborator.

* cited by examiner

PATH A: SOURCE TO ARS

PATH B: ARS TO SOURCE

PATH C: SOURCE TO ADVERTISER

PATH D: ADVERTISER TO SOURCE

PATH E: ARS TO ADVERTISER (OPTIONAL)

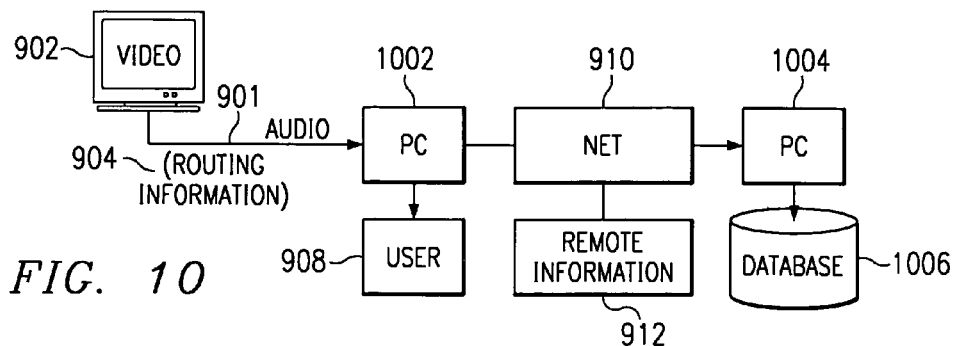
FIG. 10
FIG. 11
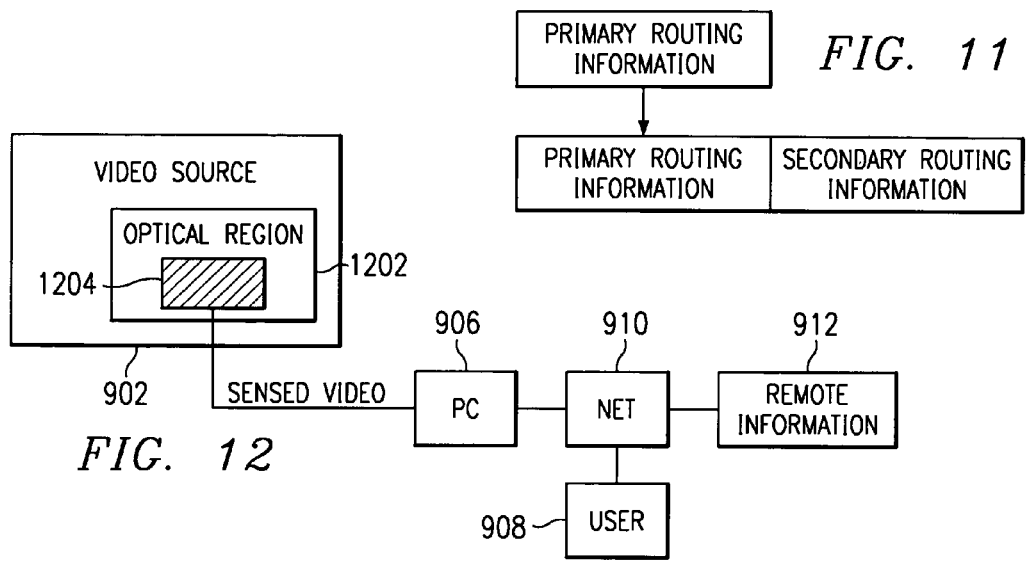
FIG. 12
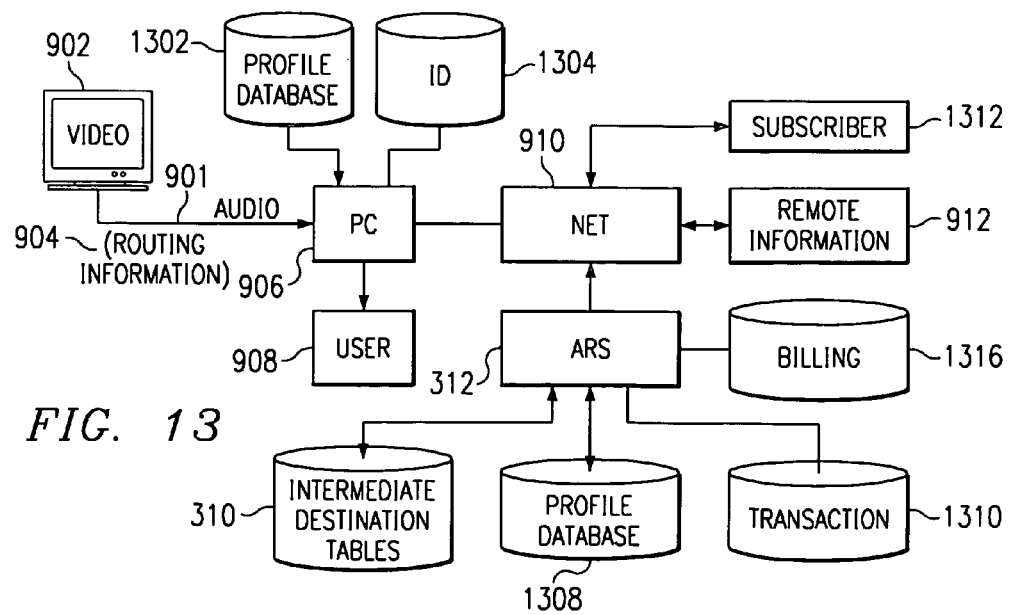
FIG. 13

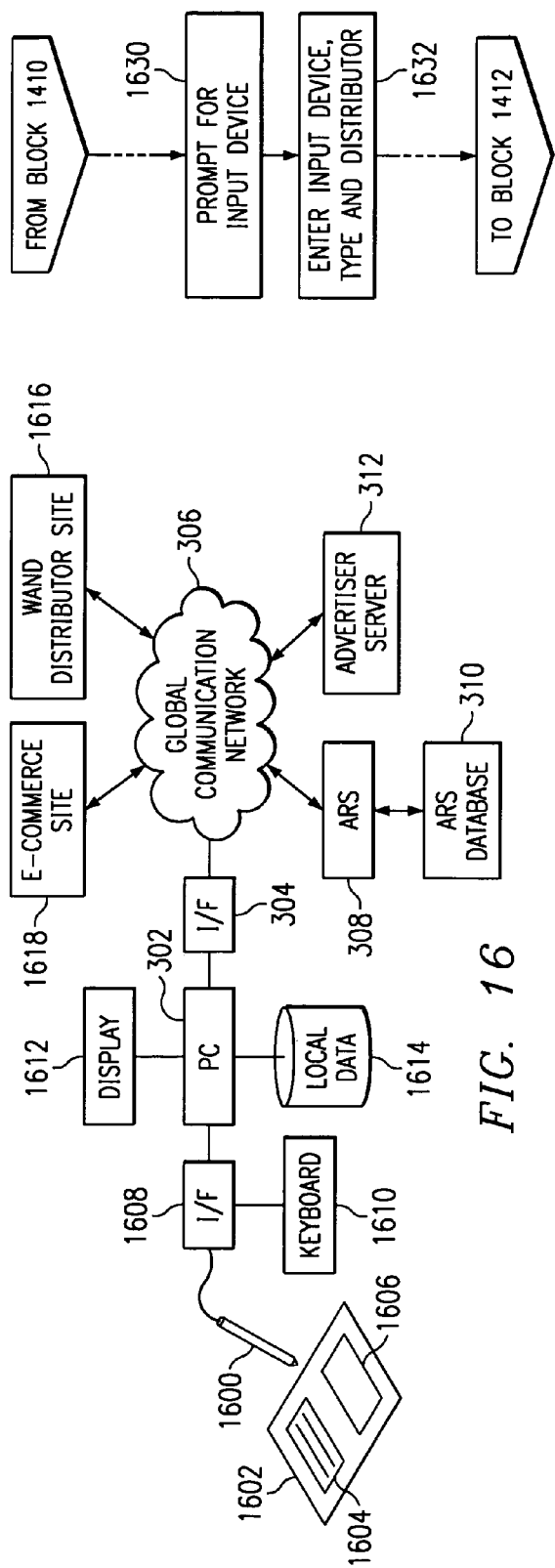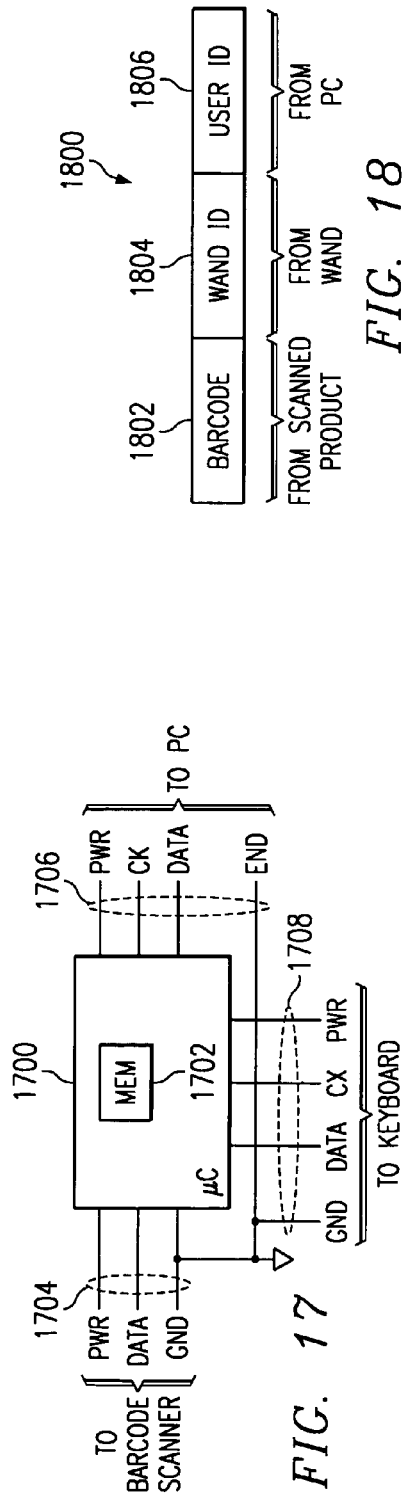

METHOD AND APPARATUS FOR LINKING A WEB BROWSER LINK TO A PROMOTIONAL OFFER

CROSS-REFERENCE TO RELATED APPLICATIONS

This application is a Continuation-in-Part of pending U.S. patent application Ser. No. 09/378,221 entitled "METHOD AND APPARATUS FOR ACCESSING A REMOTE LOCATION BY SCANNING AN OPTICAL CODE," filed on Aug. 19, 1999, which is a Continuation-in-Part of pending U.S. patent application Ser. No. 09/151,471 entitled "METHOD FOR INTERFACING SCANNED PRODUCT INFORMATION WITH A SOURCE FOR THE PRODUCT OVER A GLOBAL NETWORK," filed Sep. 11, 1998, and U.S. application Ser. No. 09/151,530 entitled "METHOD FOR CONTROLLING A COMPUTER WITH AN AUDIO SIGNAL," filed on Sep. 11, 1998 and which has now issued as U.S. Pat. No. 6,098,106, on Aug. 1, 2000; the present application being related to the following pending U.S. patent application Ser. No. 09/378,219 entitled "INTERACTIVE DOLL," filed on Aug. 19, 1999; Ser. No. 09/378,222 entitled "METHOD AND APPARATUS FOR EMBEDDING ROUTING INFORMATION TO A REMOTE WEB SITE IN AN AUDIO/VIDEO TRACK," filed on Aug. 19, 1999; Ser. No. 09/378,220 entitled "METHOD AND APPARATUS FOR CONTROLLING A COMPUTER FROM A REMOTE LOCATION," filed on Aug. 19, 1999; Ser. No. 09/378,216 entitled "A METHOD FOR CONTROLLING A COMPUTER USING AN EMBEDDED UNIQUE CODE IN THE CONTENT OF VIDEO TAPE MEDIA," filed on Aug. 19, 1999; Ser. No. 09/378,218 entitled "A METHOD FOR CONTROLLING A COMPUTER USING AN EMBEDDED UNIQUE CODE IN THE CONTENT OF DVD MEDIA," filed on Aug. 19, 1999; Ser. No. 09/378,217 entitled "A METHOD FOR CONTROLLING A COMPUTER USING AN EMBEDDED UNIQUE CODE IN THE CONTENT OF CD MEDIA," filed on Aug. 19, 1999; Ser. No. 09/378,215 entitled "A METHOD FOR CONTROLLING A COMPUTER USING AN EMBEDDED UNIQUE CODE IN THE CONTENT OF DAT MEDIA," filed on Aug. 19, 1999; and related to the following co-pending U.S. patent applications filed on even date with the present application Ser. No. 09/382,427 entitled "METHOD AND APPARATUS FOR OPENING AND LAUNCHING A WEB BROWSER IN RESPONSE TO AN AUDIBLE SIGNAL;" Ser. No. 09/382,426 entitled "METHOD AND APPARATUS FOR COMPLETING, SECURING AND CONDUCTING AN E-COMMERCE TRANSACTION;" Ser. No. 09/382,424 entitled "METHOD AND APPARATUS FOR TRACKING USER PROFILE AND HABITS ON A GLOBAL NETWORK;" Ser. No. 09/382,425 entitled "METHOD AND APPARATUS FOR DIRECTING AN EXISTING PRODUCT CODE TO A REMOTE LOCATION;" Ser. No. 09/382,373 entitled "METHOD AND APPARATUS FOR LAUNCHING A WEB SITE WITH A NON-STANDARD CONTROL INPUT DEVICE;" Ser. No. 09/382,374 entitled "METHOD AND APPARATUS FOR ALLOWING A BROADCAST TO REMOTELY CONTROL A COMPUTER;" Ser. No. 09/382,371 entitled "METHOD AND APPARATUS FOR LAUNCHING A WEB SITE IN RESPONSE TO SCANNING OF A PRODUCT CODE;" Ser. No. 09/382,372 entitled "METHOD AND APPARATUS FOR MATCHING A USER'S USE PROFILE IN COMMERCE WITH A BROADCAST;" Ser. No. 09/382,423 entitled "METHOD AND APPARATUS FOR UTILIZING AN AUDIBLE SIGNAL TO INDUCE A USER TO SELECT AN E-COMMERCE FUNCTION;" Ser. No. 09/382,421 entitled "A COMBINED PRODUCT CODE AND INSIGNIA FOR SIGNIFYING AN INTERNAL INTERACTIVE CODE;" Ser. No. 09/382,420 entitled "DIGITAL ID FOR SELECTING WEB BROWSER AND USE PREFERENCES OF A USER DURING USE OF A WEB APPLICATION;" Ser. No. 09/382,422 entitled "UNIQUE ID FOR IDENTIFYING A USER AND FACILITATING AN E-COMMERCE TRANSACTION;" Ser. No. 09/382,376 entitled "METHOD AND APPARATUS FOR CONTROLLING A USER'S PC THROUGH AN AUDIO/VISUAL BROADCAST TO ARCHIVE INFORMATION IN THE USER'S PC;" Ser. No. 09/382,375 entitled "METHOD AND APPARATUS FOR UTILIZING AN EXISTING PRODUCT CODE TO ISSUE A MATCH TO A PREDETERMINED LOCATION ON A GLOBAL NETWORK;" Ser. No. 09/379,699 entitled "NETWORK ROUTING UTILIZING A PRODUCT CODE;" and Ser. No. 09/379,700 entitled "METHOD FOR INTERCONNECTING TWO LOCATIONS OVER A NETWORK IN RESPONSE TO USING A TOOL."

TECHNICAL FIELD OF THE INVENTION

The present invention is related to a method of computer control and, more particularly, to a system for linking a web browser to a promotional offer.

BACKGROUND OF THE INVENTION

With the growing numbers of computer users connecting to the "Internet," many companies are seeking the substantial commercial opportunities presented by such a large user base. For example, one technology which exists allows a television ("TV") signal to trigger a computer response in which the consumer will be guided to a personalized web page. The source of the triggering signal may be a TV, video tape recorder, or radio. For example, if a viewer is watching a TV program in which an advertiser offers viewer voting, the advertiser may transmit a unique signal within the television signal which controls a program known as a "browser" on the viewer's computer to automatically display the advertiser's web page. The viewer then simply makes a selection which is then transmitted back to the advertiser.

In order to provide the viewer with the capability of responding to a wide variety of companies using this technology, a database of company information and Uniform Resource Locator ("URL") codes is necessarily maintained in the viewer's computer, requiring continuous updates. URLs are short strings of data that identify resources on the Internet: documents, images, downloadable files, services, electronic mailboxes, and other resources. URLs make resources available under a variety of naming schemes and access methods such as HTTP, FTP, and Internet mail, addressable in the same simple way. URLs reduce the tedium of "login to this server, then issue this magic command . . . " down to a single click. The Internet uses URLs to specify the location of files on other servers. A URL includes the type of resource being accessed (e.g., Web, gopher, FTP), the address of the server, and the location of the file. The URL can point to any file on any networked computer. Current technology requires the viewer to perform periodic updates to obtain the most current URL database. This aspect of the current technology is cumbersome since the update process requires downloading information to the viewer's computer. Moreover, the likelihood for error in performing the update, and the necessity of redoing the update in the event of a later computer crash, further complicates the process. Additionally, current technologies are limited in the number of companies which may be stored in the database. This is a significant limitation since world-wide access presented by the Internet and the increasing number of companies connecting to perform on-line E-commerce necessitates a large database.

SUMMARY OF THE INVENTION

The present invention disclosed and claimed herein comprises a method for offering a promotion to a user. A stimulus is received from a broadcast directed to a user location, the stimulus having unique coded information encoded therein. The unique coded information is extracted from the stimulus by decoding this information. From the decoded information, there is determined routing information for routing over a network to a promotion location on the network, which promotion location is operable to offer a promotion. The promotion location on the network is then interconnected in accordance with the determined routing information. A promotion is then offered over the network in response to the interconnection thereof by the step of interconnecting.

BRIEF DESCRIPTION OF THE DRAWINGS

For a more complete understanding of the present invention and the advantages thereof, reference is now made to the following description taken in conjunction with the accompanying Drawings in which:

FIG. 10 illustrates a more detailed, simplified block diagram of the embodiment of FIG. 9;

FIG. 11 illustrates a diagrammatic view of a method for performing the routing operation;

FIG. 12 illustrates a block diagram of an alternate embodiment utilizing an optical region in the video image for generating the routing information;

FIG. 13 illustrates a block diagram illustrating the generation of a profile with the disclosed embodiment;

FIG. 16 illustrates a general block diagram of a disclosed embodiment;

FIG. 16a illustrates a flowchart depicting the operation wherein the input device is registered;

FIG. 17 illustrates the conversion circuit of the wedge interface;

FIG. 18 illustrates a sample message packet transmitted from the user PC to the ARS;

DETAILED DESCRIPTION OF THE INVENTION

Figure 1:
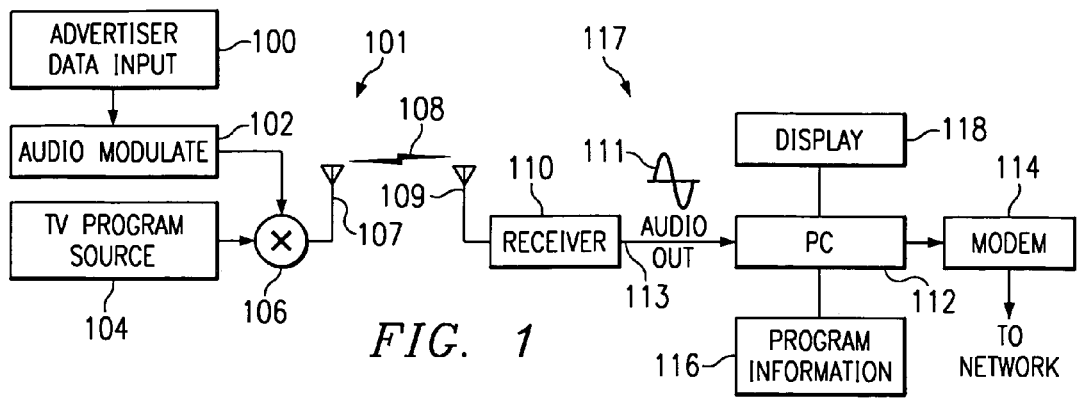
FIG. 1 illustrates a block diagram of the preferred embodiment.

Referring now to FIG. 1, there is illustrated a block diagram of a system for controlling a personal computer ("PC") 112 via an audio tone transmitted over a wireless system utilizing a TV. In the embodiment illustrated in FIG. 1, there is provided a transmission station 101 and a receive station 117 that are connected via a communication link 108. The transmission station 101 is comprised of a television program source 104, which is operable to generate a program in the form of a broadcast signal comprised of video and audio. This is transmitted via conventional techniques along channels in the appropriate frequencies. The program source is input to a mixing device 106, which mixing device is operable to mix in an audio signal. This audio signal is derived from an audio source 100 which comprises a coded audio signal which is then modulated onto a carrier which is combined with the television program source 104. This signal combining can be done at the audio level, or it can even be done at the RF level in the form of a different carrier. However, the preferred method is to merely sum the audio signal from the modulator 102 into the audio channel of the program that is generated by the television program source 104. The output thereof is provided from the mixing device 106 in the form of broadcast signal to an antenna 107, which transmits the information over the communication link 108 to an antenna 109 on the receive side.

On the receive side of the system, a conventional receiver 110, such as a television is provided. This television provides a speaker output which provides the user with an audible signal. This is typically associated with the program. However, the receiver 110 in the disclosed embodiment, also provides an audio output jack, this being the type RCA jack. This jack is utilized to provide an audio output signal on a line 113 which is represented by an audio signal 111. This line 113 provides all of the audio that is received over the communication link 108 to the PC 112 in the audio input port on the PC 112. However, it should be understood that, although a direct connection is illustrated from the receiver 110 to the PC 112, there actually could be a microphone pickup at the PC 112 which could pick the audio signal up. In the disclosed embodiment, the audio signal generated by the advertiser data input device 100 is audible to the human ear and, therefore, can be heard by the user. Therefore, no special filters are needed to provide this audio to the PC 112.

The PC 112 is operable to run programs thereon which typically are stored in a program file area 116. These programs can be any type of programs such as word processing programs, application programs, etc. In the disclosed embodiment, the program that is utilized in the system is what is referred to as a "browser." The PC 112 runs a browser program to facilitate the access of information on the network, for example, a global communication network known as the "Internet" or the World-Wide-Web ("Web"). The browser is a hypertext-linked application used for accessing information. Hypertext is a term used to describe a particular organization of information within a data processing system, and its presentation to a user. It exploits the computer's ability to link together information from a wide variety of sources to provide the user with the ability to explore a particular topic. The traditional style of presentation used in books employs an organization of the information which is imposed upon it by limitations of the medium, namely fixed sized, sequential paper pages. Hypertext systems, however, use a large number of units of text or other types of data such as image information, graphical information, video information, or sound information, which can vary in size. A collection of such units of information is termed a hypertext document, or where the hypertext documents employ information other than text, hypermedia documents. Multimedia communications may use the Hypertext Transfer Protocol ("HTTP"), and files or formatted data may use the Hypertext Markup Language ("HTML"). This formatting language provides for a mingling of text, graphics, sound, video, and hypertext links by "tagging" a text document using HTML. Data encoded using HTML is often referred to as an "HTML document," an "HTML page," or a "home page." These documents and other Internet resources may be accessed across the network by means of a network addressing scheme which uses a locator referred to as a Uniform Resource Locator ("URL"), for example, "http://www.digital.com."

The Internet is one of the most utilized networks for interconnecting distributed computer systems and allows users of these computer systems to exchange data all over the world. Connected to the Internet are many private networks, for example, corporate or commercial networks. Standard protocols, such as the Transport Control Protocol ("TCP") and the Internet Protocol ("IP") provide a convenient method for communicating across these diverse networks. These protocols dictate how data are formatted and communicated. As a characteristic of the Internet, the protocols are layered in an IP stack. At higher levels of the IP stack, such as the application layer (where HTTP is employed), the user information is more readily visible, while at lower levels, such as the network level (where TCP/IP are used), the data can merely be observed as packets or a stream of rapidly moving digital signals. Superimposed on the Internet is a standard protocol interface for accessing Web resources, such as servers, files, Web pages, mail messages, and the like. One way that Web resources can be accessed is by browsers made by Netscape® and Microsoft Internet Explorer®.

Referring again now to FIG. 1, the user can load this program with the appropriate keystrokes such that a browser window will be displayed on a display 118. In one embodiment, the user can run the browser program on the PC 112 such that the browser window is displayed on the display 118. While watching a preferred program, the user can also view display 118. When an audio signal is received by the receiver 110 and the encoded information is contained therein that was input thereto by the advertiser, the PC 112 will then perform a number of operations. The first operation, according to the disclosed embodiment, is to extract the audio information within the received audio signal in the form of digital data, and then transmit this digital data to a defined location on the global communication network via a modem connection 114. This connection will be described hereinbelow. This information will be relayed to a proprietary location and the instructions sent back to the PC 112 as to the location of the advertiser associated with the code, and the PC 112 will then effect a communication link to that location such that the user can view on the display 118 information that the advertiser, by the fact of putting the tone onto the broadcast channel, desires the viewer to view. This information can be in the form of interactive programs, data files, etc. In one example, when an advertisement appears on the television, the tone can be generated and then additional data displayed on the display 118. Additionally, a streaming video program could be played on the PC received over the network, which streaming video program is actually longer than the advertising segment on the broadcast. Another example would be a sports game that would broadcast the tone in order to allow a user access to information that is not available over the broadcast network, such as additional statistics associated with the sports program, etc.

By utilizing the system described herein with respect to the disclosed embodiment of FIG. 1, an advertiser is allowed the ability to control a user's PC 112 through the use of tones embedded within a program audio signal. As will described hereinbelow, the disclosed embodiment utilizes particular routing information stored in the PC 112 which allows the encoded information in the received audio signal to route this information to a desired location on the network, and then allow other routing information to be returned to the PC 112 for control thereof to route the PC 112 to the appropriate location associated with that code.

Figure 2:
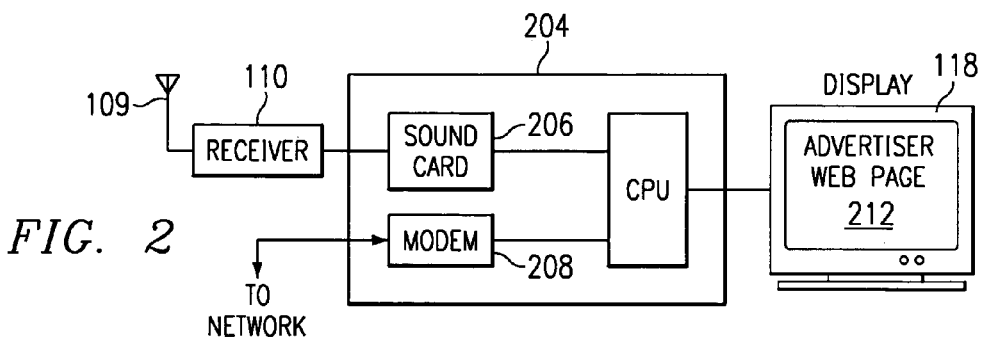
FIG. 2 illustrates the computer components employed in this embodiment.

Referring now to FIG. 2, there is illustrated a computer 204, similar to computer 112, connected to display information on display 118. The computer 204 comprises an internal audio or "sound" card 206 for receiving the transmitted audio signal through receive antenna 109 and receiver 110. The sound card 206 typically contains analog-to-digital circuitry for converting the analog audio signal into a digital signal. The digital signal may then be more easily manipulated by software programs. The receiver 110 separates the audio signal from the video signal. A special trigger signal located within the transmitted advertiser audio signal triggers proprietary software running on the computer 204 which launches a communication application, in this particular embodiment, the web browser application located on the PC 204. Coded advertiser information contained within the audio signal is then extracted and appended with the address of a proprietary server located on the communication network. The remote server address is in the form of a URL. This appended data, in addition to other control codes, is inserted directly into the web browser application for automatic routing to the communication network.

The web browser running on PC 204, and communicating to the network through an internal modem 208, in this embodiment, transmits the advertiser information to the remote server. The remote server cross-references the advertiser product information to the address of the advertiser server located on the network. The address of the advertiser server is routed back through the PC 204 web browser to the advertiser server. The advertiser product information is returned to PC 204 to be presented to the viewer on display 118. In this particular embodiment, the particular advertiser product information displayed is contained within the advertiser's web page 212. As mentioned above, the audio signal is audible to the human ear. Therefore the audio signal, as emitted from the TV speakers, may be input to the sound card 206 via a microphone. Furthermore, the audio signal need not be a real-time broadcast, but may be on video tapes, CDs, DVD, or other media which may be displayed at a later date. With the imminent implementation of high definition digital television, the audio signal output from the TV may also be digital. Therefore, direct input into a sound card for A/D purposes may not be necessary, but alternative interfacing techniques to accommodate digital-to-digital signal formats would apply.

Figure 3:
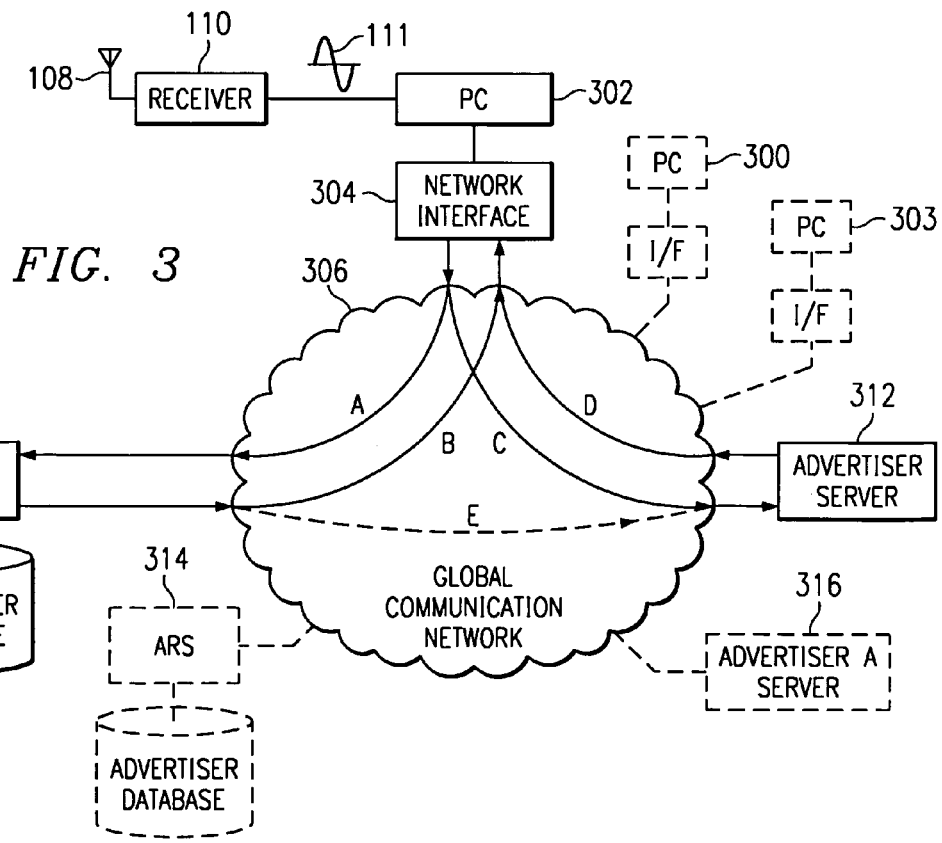
FIG. 3 illustrates system interactions over a global network.

Referring now to FIG. 3, there is illustrated a source PC 302, similar to PCs 204 and 112, connected to a global communication network (GCN) 306 through an interface 304. In this embodiment, the audio signal 111 is received by PC 302 through its sound card 206. The audio signal 111 comprises a trigger signal which triggers proprietary software into launching a web browser application residing on the PC 302. The audio signal 111 also comprises advertiser product information which is extracted and appended with URL information of an Advertiser Reference Server ("ARS") 308. The ARS 308 is a system disposed on the GCN 306 that is defined as the location to which data in the audio signal 111 is to be routed. As such, data in the audio signal 111 will always be routed to the ARS 308, since a URL is unique on the GCN 306. Connected to the ARS 308 is a database 310 of product codes and associated manufacturer URLs. The database 310 undergoes a continual update process which is transparent to the user. As companies sign-on, i.e., subscribe, to this technology, manufacturer and product information is added to the database 310 without interrupting operation of the source PC 302 with frequent updates. When the advertiser server address URL is obtained from the ARS database 310, it and the request for the particular advertiser product information are automatically routed back through the web browser on PC 302, over to the respective advertiser server for retrieval of the advertiser product information to the PC 302. It should be noted that although the disclosed invention discusses a global communication network, the system is also applicable to LANs, WANs, and peer-to-peer network configurations. Additionally, although the disclosed architecture is not limited to a single source PC 302, but may comprise a plurality of source PCs, e.g., PC 300 and PC 303. Moreover, a plurality of ARS 308 systems and advertiser servers 312 may be implemented, e.g., ARS 314, and advertiser server A 316, respectively.

The information transactions, in general, which occur between the networked systems of this embodiment, over the communication network, are the following. The web browser running on source PC 302 transmits a message packet to the ARS 308 over Path "A." The ARS 308 decodes the message packet and performs a cross-reference function with product information extracted from the received message packet to obtain the address of an advertiser server 312. A new message packet is assembled comprising the advertiser server 312 address, and sent back to the source PC 302 over Path "B." A "handoff" operation is performed whereby the source PC 302 browser simply reroutes the information on to the advertiser server 312 over Path "C," with the appropriate source and destination address appended. The advertiser server 312 receives and decodes the message packet. The request-for-advertiser-product-information is extracted and the advertiser 312 retrieves the requested information from its database for transmission back to the source PC 302 over Path "D." The source PC 302 then processes the information, i.e., for display to the viewer. The optional Path "E" is discussed hereinbelow. It should be noted that the disclosed methods are not limited to only browser communication applications, but may accommodate, with sufficient modifications by one skilled in the art, other communication applications used to transmit information over the Internet or communication network.

Figure 4A:
FIGS. 4a-4e illustrate the various message packets transmitted between the source PC and network servers used in the preferred embodiment.

Referring now to FIG. 4a, the message packet 400 sent from the source PC 302 to ARS 308 via Path "A" comprises several fields. One field comprises the URL of the ARS 308 which indicates where the message packet is to be sent. Another field comprises the advertiser product code or other information derived from the audio signal 111, and any additional overhead information required for a given transaction. The product code provides a link to the address of the advertiser server 312, located in the database 310. Yet another field comprises the network address of the source PC 302. In general, network transmissions are effected in packets of information, each packet providing a destination address, a source address, and data. These packets vary depending upon the network transmission protocol utilized for communication. Although the protocols utilized in the disclosed embodiment are of a conventional protocol suite commonly known as TCP/IP, it should be understood that any protocols providing the similar basic functions can be used, with the primary requirement that a browser can forward the routing information to the desired URL in response to keystrokes being input to a PC. However, it should be understood that any protocol can be used, with the primary requirement that a browser can forward the product information to the desired URL in response to keystrokes being input to a PC. Within the context of this disclosure, "message packet" shall refer to and comprise the destination URL, product information, and source address, even though more than a single packet must be transmitted to effect such a transmission.

Figure 4B:

Upon receipt of the message packet 400 from source PC 302, ARS 308 processes the information in accordance with instructions embedded in the overhead information. The ARS 308 specifically will extract the product code information from the received packet 400 and, once extracted, will then decode this product code information. Once decoded, this information is then compared with data contained within the ARS advertiser database 310 to determine if there is a "hit." If there is no "hit" indicating a match, then information is returned to the browser indicating such. If there is a "hit," a packet 402 is assembled which comprises the address of the source PC 302, and information instructing the source PC 302 as to how to access, directly in a "handoff" operation, another location on the network, that of an advertiser server 312. This type of construction is relatively conventional with browsers such as Netscape® and Microsoft Internet Explorer® and, rather than displaying information from the ARS 308, the source PC 302 can then access the advertiser server 312. The ARS 308 transmits the packet 402 back to source PC 302 over Path "B." Referring now to FIG. 4b, the message packet 402 comprises the address of the source PC 302, the URL of the advertiser server 312 embedded within instructional code, and the URL of the ARS 308.

Figure 4C:

Upon receipt of the message packet 402 by the source PC 302, the message packet 402 is disassembled to obtain pertinent routing information for assembly of a new message packet 404. The web browser running on source PC 302 is now directed to obtain, over Path "C," the product information relevant to the particular advertiser server 312 location information embedded in message packet 404. Referring now to FIG. 4c, the message packet 404 for this transaction comprises the URL of the advertiser server 312, the request-for-product-information data, and the address of the source PC 302.

Figure 4D:

Upon receipt of the message packet 404 from source PC 302, advertiser server 312 disassembles the message packet 404 to obtain the request-for-product-information data. The advertiser server 312 then retrieves the particular product information from its database, and transmits it over Path "D" back to the source PC 302. Referring now to FIG. 4d, the message packet 406 for this particular transaction comprises the address of the source PC 302, the requested information, and the URL of the advertiser server 312.

Figure 4E:
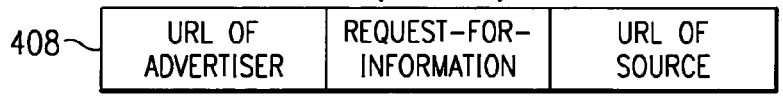

Optionally, the ARS 308 may make a direct request for product information over Path "E" to advertiser server 312. In this mode, the ARS 308 sends information to the advertiser server 312 instructing it to contact the source PC 302. This, however, is unconventional and requires more complex software control. The message packet 408 for this transaction is illustrated in FIG. 4e, which comprises the URL of the advertiser server 312, the request-for-product-information data, and the address of the source PC 302. Since product information is not being returned to the ARS 308, but directly to the source PC 302, the message packet 408 requires the return address to be that of the source PC 302. The product information is then passed directly to PC 302 over Path "D."

Figures 5, 7:
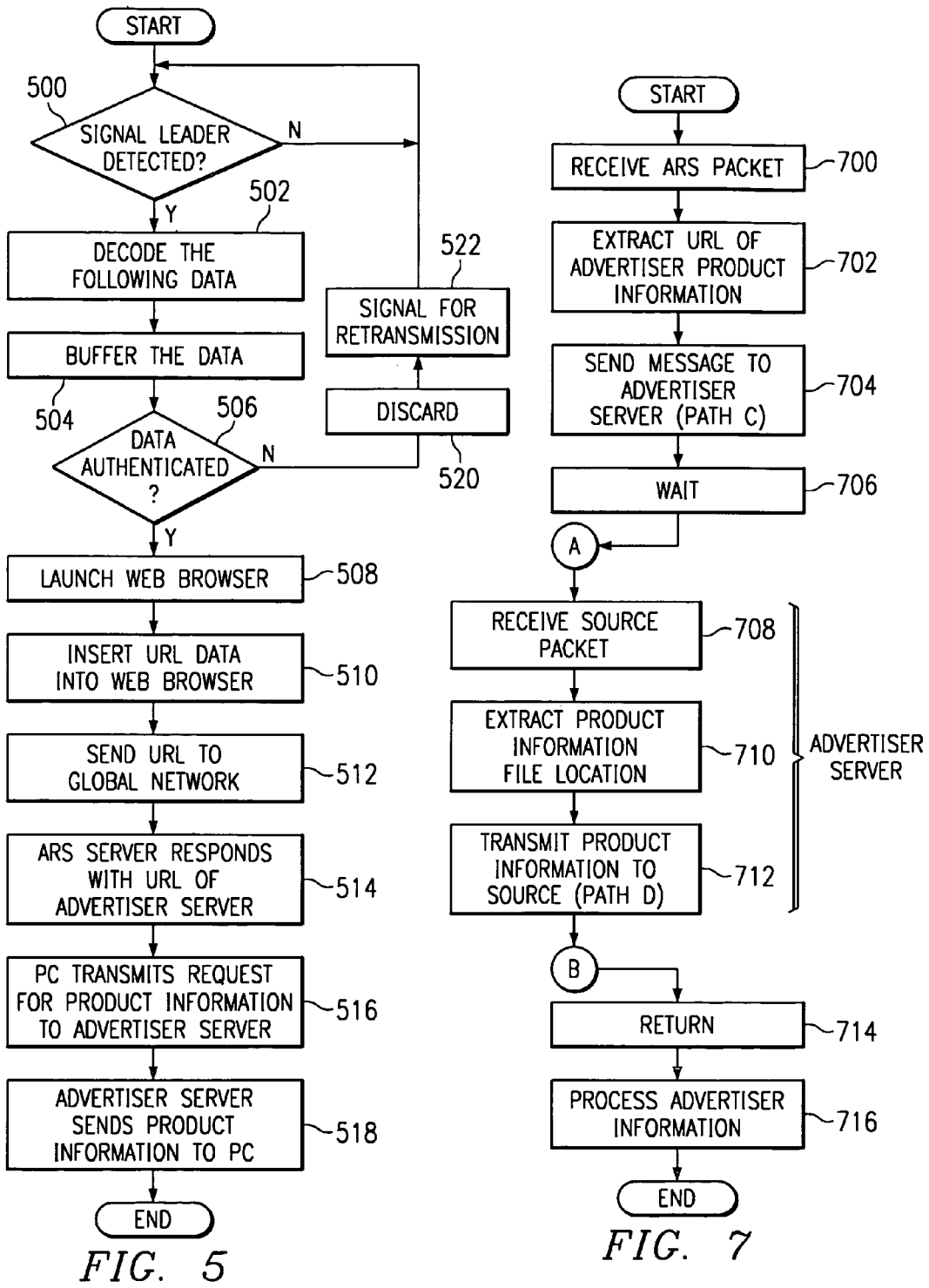
FIG. 5 is a flowchart depicting operation of the system according to the preferred embodiment.
FIG. 7 illustrates a flowchart of the interactive process between the source computer and ARS.

Referring now to FIG. 5, the method for detecting and obtaining product information is as follows. In decision block 500, a proprietary application running resident on a source computer PC 302 (similar to PC 204) monitors the audio input for a special trigger signal. Upon detection of the trigger signal, data following the trigger signal is decoded for further processing, in function block 502. In function block 504, the data is buffered for further manipulation. In decision block 506, a determination is made as to whether the data can be properly authenticated. If not, program flow continues through the "N" signal to function block 520 where the data is discarded. In function block 522, the program then signals for a retransmission of the data. The system then waits for the next trigger signal, in decision block 500. If properly authenticated in decision block 506, program flow continues through the "Y" signal path where the data is then used to launch the web browser application, as indicated in function block 508. In function block 510, the web browser receives the URL data, which is then automatically routed through the computer modem 208 to the network interface 304 and ultimately to the network 306. In function block 514, the ARS 308 responds by returning the URL of advertiser server 312 to the PC 302. In function block 516, the web browser running on the source PC 302, receives the advertiser URL information from the ARS 308, and transmits the URL for the product file to the advertiser server 312. In block 518, the advertiser server 312 responds by sending the product information to the source PC 302 for processing.

The user may obtain the benefits of this architecture by simply downloading the proprietary software over the network. Other methods for obtaining the software are well-known; for example, by CD, diskette, or pre-loaded hard drives.

Figure 6:
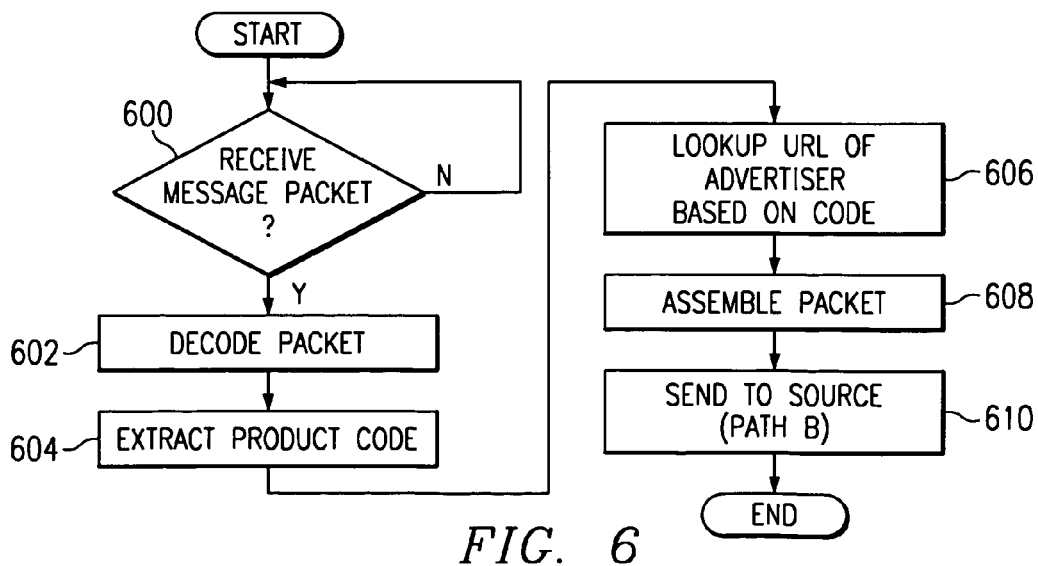
FIG. 6 illustrates a flowchart of actions taken by the Advertiser Reference Server ("ARS") server.

Referring now to FIG. 6, there is illustrated a flowchart of the process the ARS 308 may undergo when receiving the message packet 400 from the source PC 302. In decision block 600, the ARS 308 checks for the receipt of the message packet 400. If a message packet 400 is not received, program flow moves along the "N" path to continue waiting for the message. If the message packet 400 is received, program flow continues along path "Y" for message processing. Upon receipt of the message packet 400, in function block 602, the ARS 308 decodes the message packet 400. The product code is then extracted independently in function block 604 in preparation for matching the product code with the appropriate advertiser server address located in the database 310. In function block 606, the product code is then used with a lookup table to retrieve the advertiser server 312 URL of the respective product information contained in the audio signal data. In function block 608, the ARS 308 then assembles message packet 402 for transmission back to the source PC 302. Function block 610 indicates the process of sending the message packet 402 back to the source PC 302 over Path "B."

Referring now to FIG. 7, there is illustrated a flowchart of the interactive processes between the source PC 302 and the advertiser server 312. In function block 700, the source PC 302 receives the message packet 402 back from the ARS 308 and begins to decode the packet 402. In function block 702, the URL of the advertiser product information is extracted from the message packet 402 and saved for insertion into the message packet 404 to the advertiser server 312. The message packet 404 is then assembled and sent by the source PC 302 over Path "C" to the advertiser server 312, in function block 704. While the source PC 302 waits, in function block 706, the advertiser server 312 receives the message packet 404 from the source PC 302, in function block 708, and disassembles it. The product information location is then extracted from the message packet 404 in function block 710. The particular product information is retrieved from the advertiser server 312 database for transmission back to the source PC 302. In function block 712, the product information is assembled into message packet 406 and then transmitted back to the source PC 302 over Path "D." Returning to the source PC 302 in function block 714, the advertiser product information contained in the message packet 406 received from the advertiser server 312, is then extracted and processed in function block 716.

Figure 8:
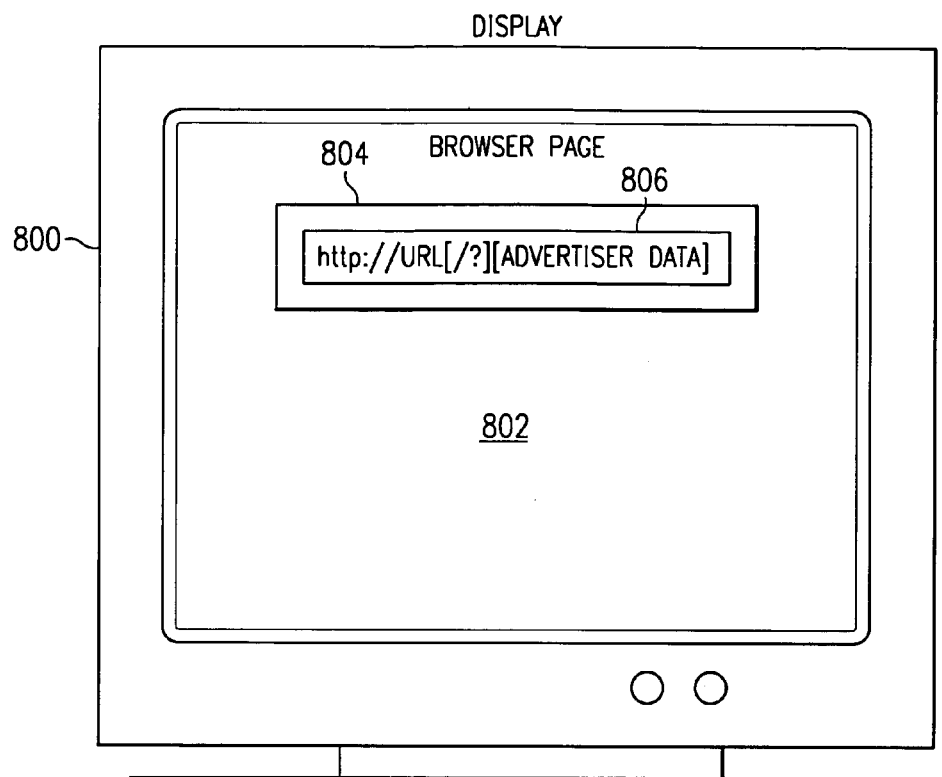
FIG. 8 illustrates a web browser page receiving the modified URL/advertiser product data according to the preferred embodiment.

Referring now to FIG. 8, after receipt of a trigger signal, a web browser application on a source PC 302 is automatically launched and computer display 800 presents a browser page 802. Proprietary software running on the source PC 302 processes the audio signal data after being digitized through the sound card 206. The software appropriately prepares the data for insertion directly into the web browser by extracting the product information code and appending keystroke data to this information. First, a URL page 804 is opened in response to a Ctrl-O command added by the proprietary software as the first character string. Opening URL page 804 automatically positions the cursor in a field 806 where additional keystroke data following the Ctrl-O command will be inserted. After URL page 804 is opened, the hypertext protocol preamble http:// is inserted into the field 806. Next, URL information associated with the location of the ARS 308 is inserted into field 806. Following the ARS 308 URL data are the characters /? to allow entry of variables immediately following the /? characters. In this embodiment, the variable following is the product information code received in the audio signal. The product code information also provides the cross-reference information for obtaining the advertiser URL from the ARS database 310. Next, a carriage return is added to send the URL/product data and close the window 804. After the message packet 400 is transmitted to the ARS 308 from the source PC 302, transactions from the ARS 308, to the source PC 302, to the advertiser server 312, and back to the source PC 302, occur quickly and are transparent to the viewer. At this point, the next information the viewer sees is the product information which was received from the advertiser server 312.

Figure 9:
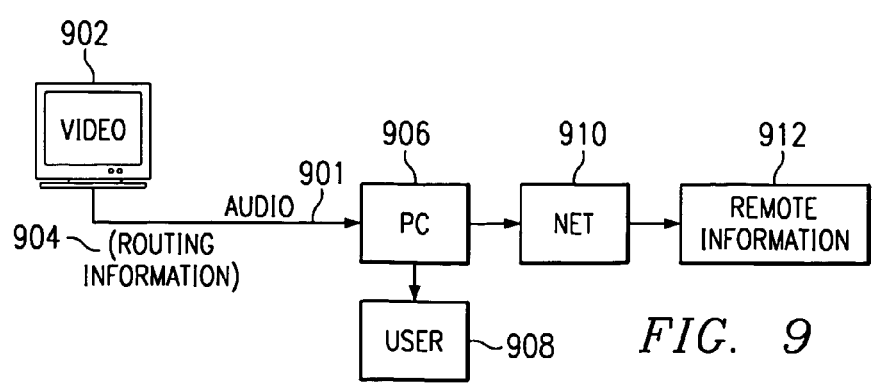
FIG. 9 illustrates a simplified block diagram of the disclosed embodiment.

Referring now to FIG. 9, there is illustrated a block diagram of a more simplified embodiment. In this embodiment, a video source 902 is provided which is operable to provide an audio output on an audio cable 901 which provides routing information referred to by reference numeral 904. The routing information 904 is basically information contained within the audio signal. This is an encoded or embedded signal. The important aspect of the routing information 904 is that it is automatically output in realtime as a function of the broadcast of the video program received over the video source 902. Therefore, whenever the program is being broadcast in realtime to the user 908, the routing information 904 will be output whenever the producer of the video desires it to be produced. It should be understood that the box 902 representing the video source could be any type of media that will result in the routing information being output. This could be a cassette player, a DVD player, an audio cassette, a CD ROM or any such media. It is only important that this is a program that the producer develops which the user 908 watches in a continuous or a streaming manner. Embedded within that program, at a desired point selected by the producer, the routing information 904 is output.

The audio information is then routed to a PC 906, which is similar to the PC 112 in FIG. 1. A user 908 is interfaced with the PC to receive information thereof, the PC 906 having associated therewith a display (not shown). The PC 906 is interfaced with a network 910, similar to the network 306 in FIG. 3. This network 910 has multiple nodes thereon, one of which is the PC 906, and another of which is represented by a network node 912 which represents remote information. The object of the present embodiment is to access remote information for display to the user 908 by the act of transmitting from the video program in block 902 the routing information 904. This routing information 904 is utilized to allow the PC 906 which has a network "browser" running thereon to "fetch" the remote information at the node 912 over the network 910 for display to the user 908. This routing information 904 is in the form of an embedded code within the audio signal, as was described hereinabove.

Referring now to FIG. 10, there is illustrated a more detailed block diagram of the embodiment of FIG. 9. In this embodiment, the PC 906 is split up into a couple of nodes, a first PC 1002 and a second PC 1004. The PC 1002 resides at the node associated with the user 908, and the PC 1004 resides at another node. The PC 1004 represents the ARS 308 of FIG. 3. The PC 1004 has a database 1006 associated therewith, which is basically the advertiser database 310. Therefore, there are three nodes on the network 910 necessary to implement the disclosed embodiment, the PC 1002, the PC 1004 and the remote information node 912. The routing information 904 is utilized by the PC 1002 for routing to the PC 1004 to determine the location of the remote information node 912 on the network 910. This is returned to the PC 1002 and a connection made directly with the remote information node 912 and the information retrieved therefrom to the user 908. The routing information 904 basically constitutes primary routing information.

Referring now to FIG. 11, there is illustrated a diagrammatic view of how the network packet is formed for sending the primary routing information to the PC 1004. In general, the primary routing information occupies a single field which primary routing information is then assembled into a data packet with the secondary routing information for transfer to the network 910. This is described hereinabove in detail.

Referring now to FIG. 12, there is illustrated an alternate embodiment to that of FIG. 9. In this embodiment, the video source 902 has associated therewith an optical region 1202, which optical region 1202 has disposed therein an embedded video code. This embedded video code could be relatively complex or as simple as a grid of dark and white regions, each region in the grid able to have a dark color for a logic "1" or a white region for a logic "0." This will allow a digital value to be disposed within the optical region 1202. A sensor 1204 can then be provided for sensing this video code. In the example above, this would merely require an array of optical detectors, one for each region in the grid to determine whether this is a logic "1" or a logic "0" state. One of the sensed video is then output to the PC 906 for processing thereof to determine the information contained therein, which information contained therein constitutes the primary routing information 904. Thereafter, it is processed as described hereinabove with reference to FIG. 9.

Referring now to FIG. 13, there is illustrated a block diagram for an embodiment wherein a user's profile can be forwarded to the original subscriber or manufacturer. The PC 906 has associated therewith a profile database 1302, which profile database 1302 is operable to store a profile of the user 908. This profile is created when the program, after initial installation, requests profile information to be input in order to activate the program. In addition to the profile, there is also a unique ID that is provided to the user 908 in association with the browser program that runs on the PC 906. This is stored in a storage location represented by a block 1304. This ID 1304 is accessible by a remote location as a "cookie" which is information that is stored in the PC 906 in an accessible location, which accessible location is actually accessible by the remote program running on a remote node.

The ARS 308, which basically constitutes the PC 1004 of FIG. 10, is operable to have associated therewith a profile database 1308, which profile database 1308 is operable to store profiles for all of the users. The profile database 1308 is a combination of the stored in profile database 1302 for all of the PCs 906 that are attachable to the system. This is to be distinguished from information stored in the database 310 of the ARS 308, the advertiser's database, which contains intermediate destination tables. When the routing information in the primary routing information 904 is forwarded to the ARS 308 and extracted from the original data packet, the lookup procedure described hereinabove can then be performed to determine where this information is to be routed. The profile database 1302 is then utilized for each transaction, wherein each transaction in the form of the routing information received from the primary routing information 904 is compared to the destination tables of the database 310 to determine what manufacturer is associated therewith.

The associated ID 1304 that is transmitted along with the routing information in primary routing information 904 is then compared with the profile database 1308 to determine if a profile associated therewith is available. This information is stored in a transaction database 1310 such that, at a later time, for each routing code received in the form of the information in primary routing information 904, there will associated therewith the IDs 1304 of each of the PCs 906. The associated profiles in database 1308, which are stored in association with IDs 1304, can then be assembled and transmitted to a subscriber as referenced by a subscriber node 1312 on the network 910. The ARS 308 can do this in two modes, a realtime mode or a non-realtime mode. In a realtime mode, each time a PC 906 accesses the advertiser database 310, that user's profile information is uploaded to the subscriber node 1312. At the same time, billing information is generated for that subscriber 1312 which is stored in a billing database 1316. Therefore, the ARS 308 has the ability to inform the subscriber 1312 of each transaction, bill for those transactions, and also provide to the subscriber 1312 profile information regarding who is accessing the particular product advertisement having associated therewith the routing information field 904 for a particular routing code as described hereinabove. This information, once assembled, can then be transmitted to the subscriber 1312 and also be reflected in billing information and stored in the billing information database 1316.

Figure 14:
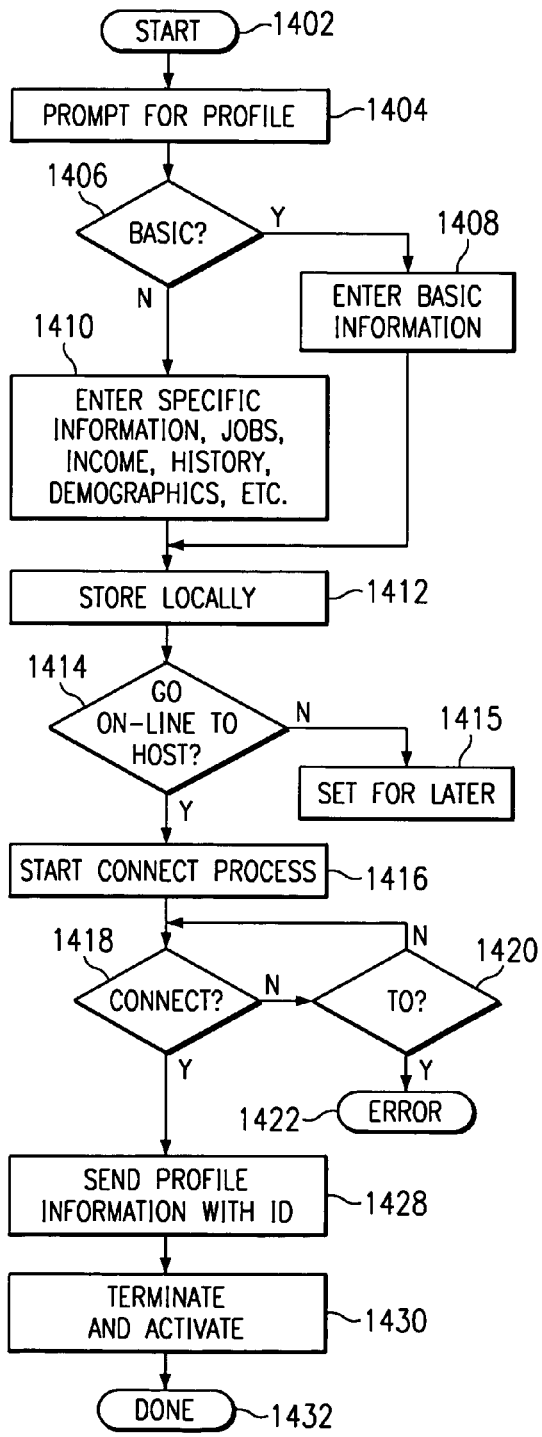
FIG. 14 illustrates a flowchart for generating the profile and storing at the ARS.

Referring now to FIG. 14, there is illustrated a flowchart depicting the operation for storing the profile for the user. The program is initiated in a block 1402 and then proceeds to a function block 1404, wherein the system will prompt for the profile upon initiation of the system. This initiation is a function that is set to activate whenever the user initially loads the software that he or she is provided. The purpose for this is to create, in addition to the setup information, a user profile. Once the user is prompted for this, then the program will flow to a decision block 1406 to determine whether the user provides basic or detailed information. This is selectable by the user. If selecting basic, the program will flow to a function block 1408 wherein the user will enter basic information such as name and serial number and possibly an address. However, to provide some incentive to the user to enter more information, the original prompt in function block 1404 would have offers for such things as coupons, discounts, etc., if the user will enter additional information. If the user selects this option, the program flows from the decision block 1406 to a function block 1410. In the function block 1410, the user is prompted to enter specific information such as job, income level, general family history, demographic information and more. There can be any amount of information collected in this particular function block.

Once all of the information is collected, in either the basic mode or the more specific mode, the program will then flow to a function block 1412 where this information is stored locally. The program then flows to a decision block 1414 to then go on-line to the host or the ARS 308. In general, the user is prompted to determine whether he or she wants to send this information to the host at the present time or to send it later. If he or she selects the "later" option, the program will flow to a function block 1415 to prompt the user at a later time to send the information. In the disclosed embodiment, the user will not be able to utilize the software until the profile information is sent to the host. Therefore, the user may have to activate this at a later time in order to connect with the host.

If the user has selected the option to upload the profile information to the host, the program will flow to the function block 1416 to initiate the connect process and then to a decision block 1418 to determine if the connection has been made. If not, the program will flow along a "N" path to decision block 1420 which will timeout to an error block 1422 or back to the input of the connect decision block 1418. The program, once connected, will then flow along a "Y" path from decision block 1418 to a function block 1428 to send the profile information with the ID of the computer or user to the host. The ID is basically, as described hereinabove, a "cookie" in the computer which is accessed by the program when transmitting to the host. The program will then flow to a function block 1430 to activate the program such that it, at later time, can operate without requiring all of the setup information. In general, all of the operation of this flowchart is performed with a "wizard" which steps the user through the setup process. Once complete, the program will flow to a Done block 1432.

Figure 15:
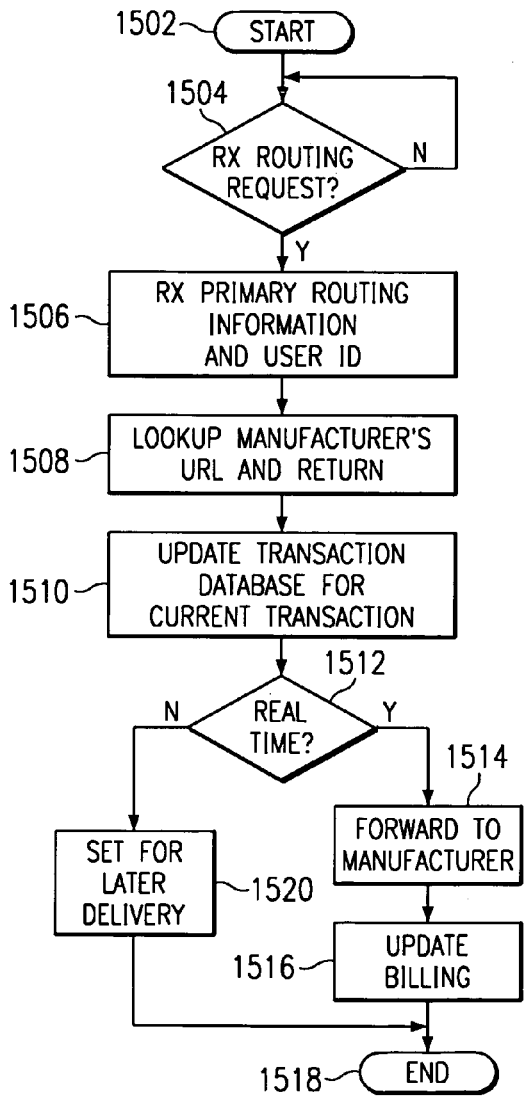
FIG. 15 illustrates a flowchart for processing the profile information when information is routed to a user.

Referring now to FIG. 15, there is illustrated a flowchart depicting the operation of the host when receiving a transaction. The program is initiated at a Start block 1502 and then proceeds to decision block 1504, wherein it is determined whether the system has received a routing request, i.e., the routing information 904 in the form of a tone, etc., embedded in the audio signal, as described hereinabove with respect to FIG. 9. The program will loop back around to the input of decision block 1504 until the routing request has been received. At this time, the program will flow along the "Y" path to a function block 1506 to receive the primary routing information and the user ID. Essentially, this primary routing information is extracted from the audio tone, in addition to the user ID. The program then flows to a function block 1508 to look up the manufacturer URL that corresponds to the received primary routing information and then return the necessary command information to the originating PC 108 in order to allow that PC 108 to connect to the destination associated with the primary routing information. Thereafter, the program will flow to a function block 1510 to update the transaction database 1310 for the current transaction. In general, the routing information 904 will be stored as a single field with the associated IDs. The profile database 1308, as described hereinabove, has associated therewith detailed profiles of each user on the system that has activated their software in association with their ID. Since the ID was sent in association with the routing information, what is stored in the transaction database 1310 is the routing code, in association with all of the IDs transmitted to the system in association with that particular routing code. Once this transaction database 1310 has been updated, as described hereinabove, the transactions can be transferred back to the subscriber at node 312 with the detailed profile information from the profile database 1308.

The profile information can be transmitted back to the subscriber or manufacturer at the node 312 in realtime or non-realtime. A decision block 1512 is provided for this, which determines if the delivery is realtime. If realtime, the program will flow along a "Y" path to a function block 1514 wherein the information will be immediately forwarded to the manufacturer or subscriber. The program will then flow to a function block 1516 wherein the billing for that particular manufacturer or subscriber will be updated in the billing database 1316. The program will then flow into an End block 1518. If it was non-realtime, the program moves along the "N" path to a function block 1520 wherein it is set for a later delivery and it is accrued in the transaction database 1310. In any event, the transaction database 1310 will accrue all information associated with a particular routing code.

With a realtime transaction, it is possible for a manufacturer to place an advertisement in a magazine or to place a product on a shelf at a particular time. The manufacturer can thereafter monitor the times when either the advertisements are or the products are purchased. Of course, they must be scanned into a computer which will provide some delay. However, the manufacturer can gain a very current view of how a product is moving. For example, if a cola manufacturer were to provide a promotional advertisement on, for example, television, indicating that a new cola was going to be placed on the shelf and that the first 1000 purchasers, for example, scanning their code into the network would receive some benefit, such as a chance to win a trip to some famous resort in Florida or some other incentive, the manufacturer would have a very good idea as to how well the advertisement was received. Further, the advertiser would know where the receptive markets were. If this advertiser, for example, had placed the television advertisement in ten cities and received overwhelming response from one city, but very poor response from another city, he would then have some inclination to believe that either the one poor-response city was not a good market or that the advertising medium he had chosen was very poor. Since the advertiser can obtain a relatively instant response and also content with that response as to the demographics of the responder, very important information can be obtained in a relatively short time.

It should be noted that the disclosed embodiment is not limited to a single source PC 302, but may encompass a large number of source computers connected over a global communication network. Additionally, the embodiment is not limited to a single ARS 308 or a single advertiser server 312, but may include a plurality of ARS and advertiser systems, indicated by the addition of ARS 314 and advertiser server A 316, respectively. It should also be noted that this embodiment is not limited only to global communication networks, but also may be used with LAN, WAN, and peer-to-peer configurations.

It should also be noted that the disclosed embodiment is not limited to a personal computer, but is also applicable to, for example, a Network Computer ("NetPC"), a scaled-down version of the PC, or any system which accommodates user interaction and interfaces to information resources.

One typical application of the above noted technique is for providing a triggering event during a program, such as a sport event. In a first example, this may be generated by an advertiser. One could imagine that, due to the cost of advertisements in a high profile sports program, there is a desire to utilize this time wisely. If, for example, an advertiser contracted for 15 seconds worth of advertising time, they could insert within their program a tone containing the routing information. This routing information can then be output to the user's PC 302 which will cause the user's PC 302 to, via the network, obtain information from a remote location typically controlled by the advertiser. This could be in the form of an advertisement of a length longer than that contracted for. Further, this could be an interactive type of advertisement. An important aspect to the type of interaction between the actual broadcast program with the embedded routing information and the manufacturer's site is the fact that there is provided information as to the user's PC 302 and a profile of the user themselves. Therefore, an advertiser can actually gain realtime information as to the number of individuals that are watching their particular advertisement and also information as to the background of those individuals, profile information, etc. This can be a very valuable asset to an advertiser.

In another example, the producer of the program, whether it be an on-air program, a program embedded in a video tape, CD-ROM, DVD, or a cassette, can allow the user to automatically access additional information that is not displayed on the screen. For example, in a sporting event, various statistics can be provided to the user from a remote location, merely by the viewer watching the program. When these statistics are provided, the advertiser can be provided with profile information and background information regarding the user. This can be important when, for example, the user may record a sports program. If the manufacturer sees that this program routing code is being output from some device at a time later than the actual broadcast itself, this allows the advertisers to actually see that their program is still being used and also what type of individual is using it. Alternatively, the broadcaster could determine the same and actually bill the advertiser an additional sum for a later broadcast. This is all due to the fact that the routing information automatically, through a PC and a network, will provide an indication to the advertiser the time at which the actual information was broadcast.

The different type of medium that can be utilized with the above embodiment are such things as advertisements, which are discussed hereinabove, contests, games, news programs, education, coupon promotional programs, demonstration media (demos), and photographs, all of which can be broadcast on a private site or a public site. This all will provide the ability to allow realtime interface with the network and the remote location for obtaining the routed information and also allow for realtime billing and accounting.

Referring now to FIG. 16, there is illustrated a general block diagram of a disclosed embodiment. A bar code scanning wand 1600 is provided by a wand distributor to customers and is associated with that distributor via a wand ID stored therein. The wand 1600 is either sold or freely distributed to customers for use with their personal computing systems. Since more and more products are being sold using bar codes, it can be appreciated that a user having the wand 1600 can scan bar codes of a multitude of products in order to obtain more information. Information about these products can be made immediately available to the user from the manufacturer for presentation by the user's computer 302. Beyond simply displaying information about the product in which the user is interested, the wand distributor may include additional advertising information for display to the user such as information about other promotions or products provided or sold by the wand distributor. Similarly, advertisers may provide catalogs of advertisements or information in newspapers or periodicals where the user simply scans the bar code associated with the advertisement using the wand 1600 to obtain further information. There is provided a paper source 1602 having contained thereon an advertisement 1604 and an associated bar code 1606. (Note that the disclosed concept is not limited to scanning of bar codes 1606 from paper sources 1602, but is also operable to scan a bar code 1606 on the product itself. Also, the wand 1600 can be any type of device that will scan any type of image having information encoded therein.) Further description of applications and operation of the bar code scanning wand 1600 and the use of the bar code information is found in pending U.S. patent application Ser. No. 09/151,471 filed on Sep. 11, 1998 and entitled "METHOD FOR INTERFACING SCANNED PRODUCT INFORMATION WITH A SOURCE FOR THE PRODUCT OVER A GLOBAL NETWORK," which application is incorporated by reference in its entirety herein.

After obtaining the wand 1600 from the wand distributor, the user connects the wand 1600 to their PC 302. During a scanning operation, wand 1600 reads bar code data 1606 and the wand ID into a "wedge" interface 1608 for conversion into keyboard data, which keyboard data is passed therefrom into the keyboard input port of PC 302. The importance of the wand ID will be discussed in more detail hereinbelow.

The wedge interface 1608 is simply an interface box containing circuitry that accommodates inputs from both the scanning wand 1600 and a computer keyboard 1610. This merely allows the information scanned by the wand 1600 to be input into the PC 302. In the disclosed embodiment, the wedge interface 1608 will convert any information. The data output from the wand 1600 is passed into the wedge interface 1608 for conversion into keyboard data which is readily recognizable by the PC 302. Therefore, the wand 1600 is not required to be connected to a separate port on the PC 302. This data is recognized as a sequence of keystrokes. However, the output of the wand 1600 can be input in any manner compatible with the PC 302. When not receiving scanner data, the wedge interface 1608 simply acts as a pass-through device for keyboard data from the keyboard 1610. In any case, the information is ultimately processed by a processor in the PC 302 and can be presented to the user on a display 1612. The wedge interface 1608 is operable to provide a decoding function for the bar code 1606 and conversion thereof to keystroke input data.

In operation, the product code of a product is provided in the form of a bar code 1606. This bar code 1606 is the "link" to a product. The disclosed embodiment is operable to connect that product information contained in the bar code 1606 with a web page of the manufacturer of that product by utilizing the bar code 1606 as the product "identifier." The program operating on the PC 302 provides routing information to the ARS 308 after launching the browser on the PC 302 and connecting to the ARS 308 over the GCN 306, which ARS 308 then performs the necessary steps to cause the browser to connect to the manufacturer web site, while also providing for an accounting step, as will be described in more detail hereinbelow.

The bar code 1606 by itself is incompatible with any kind of network for the purposes of communication therewith. It is primarily provided for a retail-type setting. Therefore, the information contained in the bar code 1606, by itself, does not allow for anything other than identification of a product, assuming that one has a database 1614 containing information as to a correlation between the product and the bar code 1606.

The wedge interface 1608 is operable to decode the bar code 1606 to extract the encoded information therein, and append to that decoded bar code information relating to an ID for the wand 1600. This information is then forwarded to the ARS 308 by the resident program in the PC 302. This is facilitated by intermediate routing information stored in the program indicating to which node on the GCN 306 the scanned bar code information is to be sent, i.e., to the ARS 308. It is important to note that the information in the bar code 1606 must be converted from its optical image to numerical values which are then ultimately input to the keyboard input port of PC 302 and converted into data compatible with communication software residing on the PC 302 (in this case, HTML language for insertion into a browser program). When the scanned information is input to the PC 302, the resident program launches the browser program and then assembles a communication packet comprised of the URL of the ARS 308, the wand ID and the user ID. If another type of communications program were utilized, then it would have to be converted into language compatible with that program. Of course, a user could actually key in the information on the bar code 102 and then append the appropriate intermediate routing information thereafter. As will be described hereinbelow, the intermediate routing information appended thereto is the URL of the ARS 308 disposed on the GCN 306.

As part of the configuration for using the wand 1600, the PC 302 hosts wand software which is operable to interpret data transmitted from the wand 1600, and to create a message packet having the scanned product information and wand ID, routing information, and a user ID which identifies the user location of the wand 1600. The wand software loads at boot-up of the PC 302 and runs in the background. In response to receiving a scanned bar code 1606, the wedge interface 1608 outputs a keystroke code (e.g., ALT-F10) to bring the wand program into the foreground for interaction by the operating system. The wand program then inserts the necessary information into the browser program. The message packet is then transmitted to interface 304 across the global communication network 306 to the ARS 308. The ARS 308 interrogates the message packet and performs a lookup function using the ARS database 310. If a match is found between particular parameters of the message packet, a return message packet is sent back to the PC 302 for processing.

The wand program running on PC 302 functions to partition the browser window displayed to the user into several individual areas. This is for the purpose of preparing to present to the user selected information in each of the individual areas (also called "framing"). The selected information comprises the product information which the user requested by scanning the bar code 1606 using the wand 1600, information about the wand distributor which establishes the identity of the company associated with that particular wand 1600, and at least one or more other frames which may be advertisements related to other products that the wand distributor sells. Note that the advertisements displayed by the wand distributor may be related to the product of interest or totally unrelated. For example, if a user scans the bar code 1606 of a soda from Company A, the wand distributor may generate an advertisement of a new soft drink being marketed by Company A, that it sells. On the other hand, the wand distributor may also structure the display of information to the user such that a user requesting product information of a Product X may get the requested information of Product X along with advertisements for a competing item Product Y. Essentially, the wand distributor is free to generate any advertisement to the user in response to the user requesting product information.

The return message packet transmitted from the ARS 308 to the PC 302 is then transmitted back across the GCN 306 to the advertiser server 312. The advertiser server 312 restructures the message packet and appends the particular product information for transmission back to the PC 302. Upon receiving the particular advertiser information from advertiser server 312, the PC 302 then retransmits a message to the wand distributor site 1616 and E-commerce site 1618 to obtain the information that needs to be framed in the browser window displayed to the user.

Therefore, the wand 1600 is associated with the wand distributor by way of a wand ID such that scanning a product bar code 1606 in order to obtain information about that particular product generates one or more responses from one or more remote sites disposed on the GCN 306. Stored in the wand 1600 is the wand ID which establishes its relationship to the wand distributor. Proprietary wand software running on the PC 302 operates to decode scanned bar code information and the wand ID received from the wand 1600 and wedge interface 1608, and also provides a unique user ID for establishing the location of the user of the wand 1600. The wand software also assembles message packets and works in conjunction with the on-board communication software (e.g., a browser) to automatically route the message packets across the GCN 306 such that the one or more remote sites disposed on the GCN 306 return information to be framed for presentation to the user.

Referring now to FIG. 16*a*, there is illustrated an addition to the flowchart of FIG. 14 for registering an input device, for one embodiment of the disclosure, with the ARS 308 in conjunction with a user ID. As described hereinabove, each user, when they generated their user profile when first contacting the ARS 308 to activate their software, defines a user ID for storage in their PC resident software. This user ID, as also described hereinabove, is utilized to identify the PC 302 to the ARS 308 whenever making a transaction. This is utilized for, among other things, updating profile information in the database 310. However, when an input device, such as the input device in the form of a wand 1600, is utilized, there are a number of ways to identify this wand 1600. One can be with the use of a unique wand ID associated with the wand 1600, as will be described hereinbelow. The other is to create a wand ID in the software program operating in the PC 302 running the PC resident background program as described hereinabove. In a situation where the ID is created in the program, reference is made to block 1410 of FIG. 14 and subsequent thereto. After the user has entered very specific information, jobs, history and demographics, etc., the system will then prompt the individual for information regarding the input device, as indicated by a function block 1630. This prompt will basically inquire as to whether the user has an input device for reading machine readable code or for sensing audible signals. It may desire to know whether the user has received an audible code from a broadcast system such as a TV, or the wand 1600 is being utilized to scan machine readable code in the form of a bar code. The program block will then flow to a function block 1632 wherein various input device types are presented to the user on their display returned over the network 306 from the ARS 308, and then the user selects which type of input device is attached to their computer. For example, it might be a scanning wand, it might be an audio input device, or any other type of device that allows for input of information. For example, it is conceivable that the unique wand ID is that of some type of tool being utilized in conjunction with the program as an input device. The unique want ID could even be the idea of a disk drive wherein the wand ID would be generalized as a tool ID.

Once the type of input device is input, then the prompt will query what type of device is attached, such as the type of scanning wand 1600. The system will then ask for the distributor of the wand 1600. Of course, as described hereinabove, the wand 1600 could have embedded therein a unique wand ID which would remove the need for inputting the distributor, as the ARS 308 will recognize this particular wand ID. However, in the situation wherein the wand ID is not disposed within the wand 1600, then the user will have to view the wand or tool 1600 to determine the distributor thereof. This is what input information would then be noted in the user profile in the ARS 308. This allows the ARS 308, at a later time, to match up the user ID, requiring no other user ID, with their user profile to determine what distributor distributed their wand 1600, such that information can be returned associated with that distributor, as will be described hereinbelow. Therefore, the combination of a user ID and a corresponding entry in the database of the ARS 308 will constitute the wand ID or tool ID.

Referring now to FIG. 17, there is illustrated a conversion circuit of the wedge interface. A microcontroller 1700 provides conversion of the data from the wand 1600 and controls interfacing of the keyboard 1610 and wand 1600 with the PC 302. The microcontroller 1700 has contained therein a memory 1702 for storing a wand ID (or even a URL for some applications) or it can have external memory. There are provided a plurality of wand interfaces 1704 to the wand 1600, a plurality of PC interfaces 1706 to the PC 302, and plurality of keyboard interfaces 1708 to the keyboard 1610. In general, the wand interfaces 1704 comprise a serial data line, a ground line, and a power line. Similarly, the keyboard interfaces 1708 comprise a serial data line, a ground line, a clock line, and a power line. The PC 302 provides a clock line, a power line, a serial data, and a ground line for input to the microcontroller 1700. The microcontroller 1700 is operable to receive signals from the keyboard 1610 and transfer the signals to the PC 302 as keyboard signals. Operation with the keyboard 1610 is essentially a "pass-through" procedure. Data output from the keyboard 1610 is already in keyboard format, and therefore requires no conversion by the wedge interface 1608. With respect to the wand 1600, the serial data is not compatible with a keyboard 1610 and, therefore, it must be converted into a keyboard format in order to allow input thereof to the keyboard input of the PC 302.

The microcontroller 1700 performs the conversion function after decoding this bar code information, and conversion of this bar code information into an appropriate stream of data which is comprised of the bar code information and the appended wand ID (or even a URL in some applications). This appended wand ID (and/or URL) will be pre-stored in the memory 1702 and is programmable at the time of manufacture. It is noted that the memory 1702 is illustrated as being contained within the microcontroller 1702 to provide a single chip solution. However, this could be external memory that is accessible by the microcontroller 1702. Therefore, the microcontroller 1700 provides an interface between the wand 1600 and the keyboard 1610 to the PC 302 which allows the wand 1600 to receive coded information and convert it to keyboard strokes or, alternatively, to merely pass-through the keystrokes from the keyboard 1610. Therefore, the user need not install any type of plug-in circuit board into the motherboard of the PC 302 in order to provide an interface to the wand 1600; rather, the user need only utilize the already available keyboard port in order to input the appropriate data into the system.

In this particular disclosed embodiment, the microcontroller 1700 comprises a PIC16C73 microcontroller by Microchip Technologies™. The PIC16C73 device is a low cost CMOS 8-bit microcontroller with an integrated analog-to-digital converter. The PIC16C73 device, as illustrated in the disclosed embodiment, has 192 bytes of RAM and 4 k×4 of EPROM memory. The microcontroller 1700 can accommodate asynchronous or synchronous inputs from input devices connected to it. In this disclosed embodiment, communication to the keyboard 1610 is synchronous while it is asynchronous when communicating with wand 1600.

It should be noted that, although in this particular embodiment bar code information of the bar code 1606 is input into the keyboard input port of the PC 302, disclosed methods may also be advantageously utilized with high speed port architectures such as Universal Serial Bus ("USB") and IEEE 1394.

Bar codes are structured to be read in either direction. Timing considerations need to be addressed because of the variety of individuals scanning the bar code introduce a wide variety of scan rates. Bar codes use bars of varying widths. The presence of a black bar generates a positive pulse, and the absence of a black bar generates no pulse. Each character of a conventional bar code has associated therewith seven pulses or bars. Depending on the width of the bars, the time between pulses varies. In this disclosed embodiment, the interface circuitry 1608 performs a "running" calculation of the scan time based upon the rising edge of the pulses commencing with the leader or header information. The minimum and maximum scans times are calculated continuously in software with the interface 1608 during the scanning process to ensure a successful scan by the user.

Referring now to FIG. 18, there is illustrated a sample message packet transmitted from the user's PC 302 to the ARS 308. The message packet 1800 comprises a number of bits of information including the bar code information 1802 obtained from the user scanning the bar code 1606 with the wand 1600; the wand ID 1804 which is embedded in a memory in the wand 1600 and identifies it with a particular wand distributor; and a user ID 1806 which is derived from the software running on the PC 302 and which identifies uniquely with the user location. Note that the message packet includes other necessary information for the proper transmission for point to point.

Figure 19:
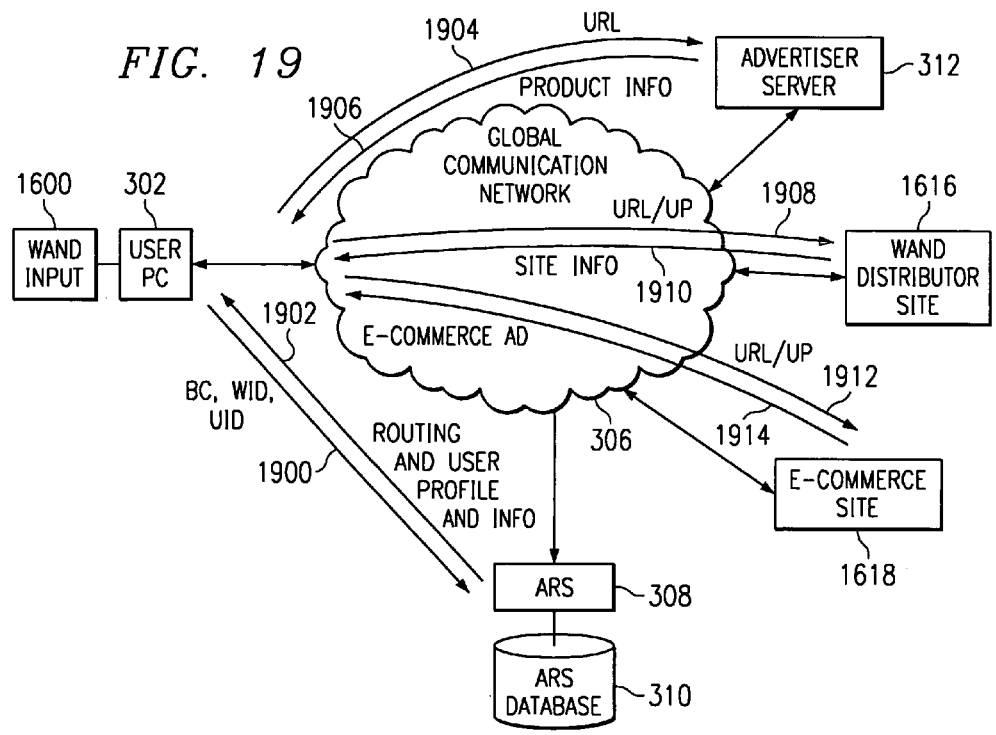
FIG. 19 illustrates a more detailed block diagram of the routing of the message packets between the various nodes.

Referring now to FIG. 19, there is illustrated a more detailed block diagram of the routing of the message packets in order to present the framed information to the user. As is mentioned hereinabove, when the user scans a bar code 1606 using the wand 1600, a wand program running on the user PC 302 is operable to interpret the information output by the wand 1600 and generate a message packet for transmission over the GCN 306. The wand program assembles the message packet such that it is directed to the ARS 308 disposed on the GCN 306. The message packet contains several pieces of information including the wand ID 1804 which links it to the wand distributor, the user ID 1806 which identifies the particular user using the wand 1600, and bar code information 1802 describing a particular product of interest to the user. This message from the PC 302 is transmitted over a path 1900 to the ARS 308 where the ARS database 310 is accessed to cross reference the ID information 1804 and bar code information 1802 to a particular advertiser and wand distributor. The ARS 308 returns a message packet over a path 1902 to the user PC 302 which contains routing information as to the location of various other sites disposed on the GCN 306, for example, the advertiser server 312 and wand distributor site 1616.

It is noted that, when the wand (or tool) is utilized, the program at the PC may recognize this and merely input the user ID in the want (or tool) ID field. Alternatively, the mere receipt of a user ID in association with product code information will trigger the ARS 308 to assume that the want 1600 was utilized. It is only important that the use of the want (or tool) be recognized and that the user's PC be routed to a location on the network preassociated with that wand (or tool) distributor. Further, it is the routing of the user's PC to a predetermined location on the network based upon the use of a particular tool, a particular type of tool or a general class of tools that elicits the connection. For example, it would be that the network connection is made in response to the suer utilizing a bar code scanner. This would connect the user to a web site for a general bar code scanner tool. For a disk drive, the program would recognize that a disk drive had been installed (or merely used) and then route the user to the web site of the disk drive manufacturer, a competitor of such or even to some marketing firm that wants to contact individuals that use or initiate such a piece of equipment.

It can be appreciated that other information can also be provided by the ARS 308 which more closely targets the particular user of the wand 1600. For example, if it is known that a particular wand 1600 is sold in a certain geographic area, this information can be useful in targeting the particular user with certain advertising information relevant to that geographic area. In any case, the information returned from the ARS 308 over path 1902 provides enough information for the wand program running on the user PC 302 to identify a number of other sites disposed on the GCN 306. The user PC 302 then processes the return message packet and routes another message packet over a path 1904 to the advertiser server 312. The advertiser server 312 then returns product information of the particular product in which the user was interested back to the user PC 302 over a path 1906. Similarly, the user PC 302 routes information (e.g., the URL of the wand distributor site and the user profile) to the wand distributor site 1616 over a path 1908 in order to obtain information back over a path 1910 for framing any banners which identify the wand distributor. Additionally, the user PC 302 forwards a message packet to the E-commerce site 1618 over a path 1912 in order to return information regarding any particular advertisements the wand distributor wants to display to the user. The advertisements are returned to the PC 302 over a path 1914.

Figure 20:
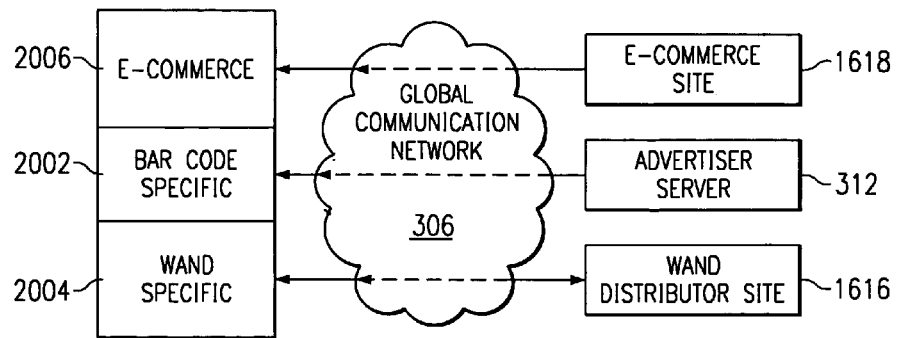
FIG. 20 illustrates a block diagram of a browser window, according to a disclosed embodiment.

Referring now to FIG. 20, there is illustrated a block diagram of a browser window according to the disclosed embodiment. The browser window 2000 is partitioned into a plurality of areas for framing specific information. A bar code area 2002 displays that product information in which the user was interested; a wand-specific area 2004 displays information about the wand distributor; and an E-commerce area 2006 displays advertising information that the wand distributor selects for display according to this particular user and wand 1600. As mentioned hereinabove, a program operable to process scanned bar code information with the unique wand 1600 develops the browser window by partitioning it into specific areas for the framing of information. Therefore, information returned from the E-commerce site 1608 is passed through the GCN 306 to the particular E-commerce frame 2006. Similarly, information about the particular product of interest is returned from the advertiser site 312 across the GCN 306 to the particular bar code specific area 2002. Information placed in the wand specific area 2004 is information about the wand distributor which is returned from the wand distributor site 1616 across GCN 306.

Figure 21:
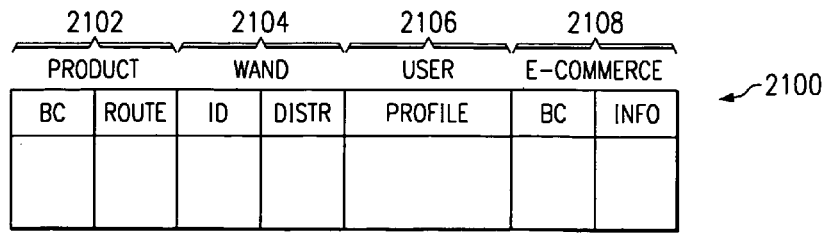
FIG. 21 illustrates a diagrammatic view of information contained in the ARS database.

Referring now to FIG. 21, there is illustrated a structure of information contained in the ARS database. The ARS database 310 contains a variety of information required to properly interrogate and assemble packets for obtaining information from the various sites disposed on the GCN 306. The ARS database 310 has a database structure 2100 which contains addresses for the web sites containing the product information requested by the user when scanning the bar code 1606 with the wand 1600. Under a product heading 2102 are listed the particular bar codes and associated routing information for addressing the respective server location. For example, the ARS server 308 may contain any number of advertisers having unique URL addresses associated therewith. Therefore, the bar code 1606 of a particular product is associated with a unique URL address which routes any request for information of that product to that particular advertiser's site. Also part of the ARS database structure 2000 is a heading of Wand 2104 under which is the wand ID 1804 and the distributor associated with that wand ID 1804.

It can be appreciated that there may be a number of distributors using the disclosed architecture such that each distributor has an ID embedded in the wand 1600 which uniquely identifies that wand with the particular distributor. Therefore, the unique wand ID 1804 needs to be listed with the respective distributors of that wand 1600 in order to process the information that needs to be framed and displayed to that particular user. Another heading under the ARS database structure 2100 is a user heading 2106 which contains profile information associated with that particular user ID 1806. As mentioned hereinabove, the user ID 1806 is obtained via the wand software running on the PC 302 and upon installation or subsequent configuration may request that the user input certain profile information which may be used to target that particular user with products and services which identify with that user profile. The ARS database structure 2100 also contains an E-commerce heading 2108 which contains information related to the bar code 1606 and an advertisement that may be triggered by the request for that information. For example, any bar code 1606 associated with a paper source 1602 can be associated with the specific information in the ARS database 310. A user wishing to obtain information about a specific soft drink may, in fact, trigger an advertising response of a competitor product. Similarly, the user interested in information about that particular soft drink may also trigger information which is relevant to that particular product or a product which may normally be served in conjunction with that soft drink. Furthermore, if the user profile indicates that this individual has significant interest in finance or insurance, the request for information regarding this particular bar coded product may trigger advertisement from an E-commerce server 1618 related to information about finance and insurance. It should be noted that the information described as contained within the ARS database structure 2100 is not limited to what has been described, but may comprise any number of pieces of information used to present desired information to the computer display of the user.

Figure 22:
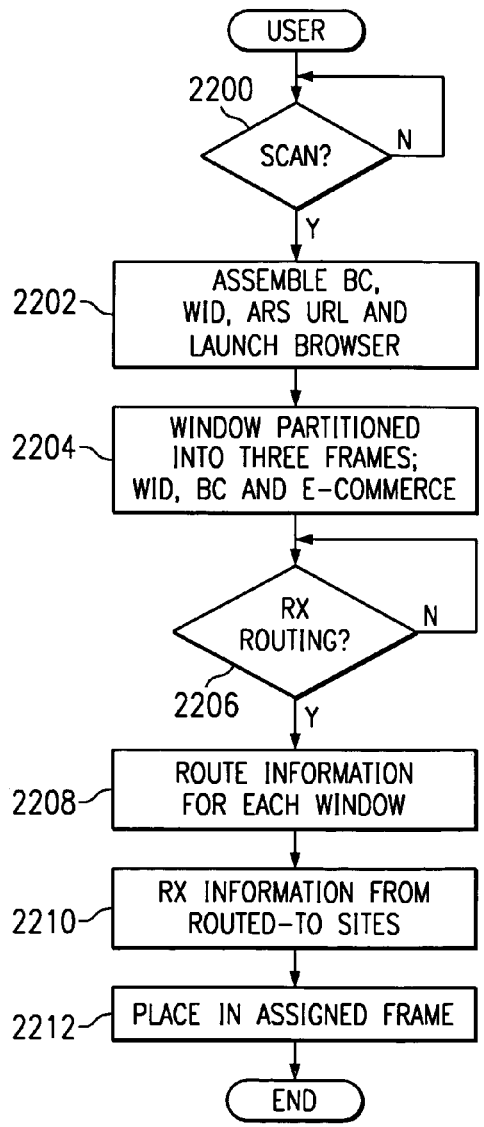
FIG. 22 illustrates a flowchart of the process of receiving information for the user's perspective.

Referring now to FIG. 22, there is illustrated a flowchart of the process of receiving information from the user's perspective, and according to the disclosed embodiment. The wand software running on the user's PC 302 runs in the background until activated by output from the wand 1600. Therefore, flow moves to a decision block 2200 where if a scanned input does not occur, flow moves out the "N" path and loops back to the input of decision block 2200. On the other hand, if scanned input information is received, flow moves out the "Y" path to a function block 2202 where the wand software assembles a message packet containing the bar code information, the wand ID 1804 and the ARS 308 URL address. Additionally, the browser is launched in which this information is placed for transmission to the ARS 308. Flow then moves to a function block 2204 where the browser is partitioned into any number of areas in which information is displayed when obtained from the wand distributor site 1616, the E-commerce site 1618, and the advertiser server 312. It should be known that although three frames are shown in the particular window 2000 of this embodiment, the number of frames displayed in the window 2000 is limited only by the available real estate of the window 2000 area itself.

After the wand software partitions the browser window into one or more frames in preparation of receipt of return information, flow moves to a decision block 2206 where the computer waits for information to be returned from the various sites disposed on the GCN 306. If information is not returned, flow moves out the "N" path and simply loops back to the input to continue monitoring for receipt of the information. If information has been received, flow moves out the "Y" path to a function block 2208 where routing information for each frame (or partitioned area of the window 2000) is inserted into one or more packets for transmission to the various sites. The various sites then return the requested information back to the PC 302, as indicated in function block 2210. Flow is then to a function block 2212 where the proprietary software working in conjunction with the hosted browser places the returned information into the respective frames of the window. The user, viewing the display at PC 302, then perceives a variety of information, one of which is the particular product information which he or she requested, in addition to wand distributor information, and possibly other advertisements based upon the user's profile.

Figure 23:
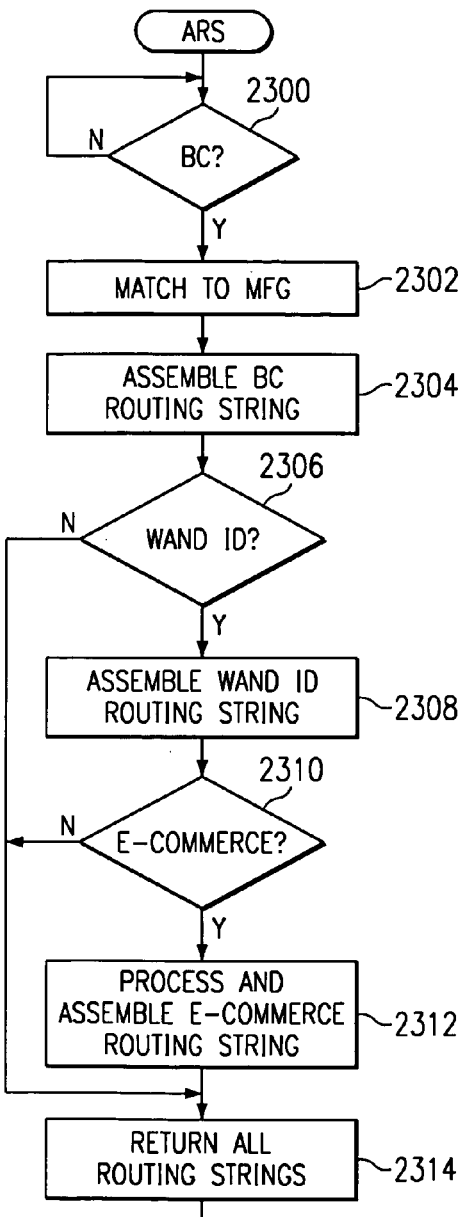
FIG. 23 illustrates a flowchart according to the ARS.

Referring now to FIG. 23, there is illustrated a flowchart of the process according to the ARS. The ARS 308 is operable to decode and process messages received from the GCN 306. Therefore, flow is to a decision block 2300 where, if bar code information is not received, flow is out the "N" path with loop-back to its input. If bar code information has been received, flow is to a function block 2302 where a matching process occurs to link the bar-coded product information to its respective manufacturer. The ARS database 310 also associates the URL address of the manufacturer's server. When a match is found, the ARS 308 begins to assemble a message packet of information for transmission back to the PC 302, as indicated in function block 2304. The message packet contains the product information and the URL address of the manufacturer's web site. Flow then moves to a decision block 2306 where the wand ID 1804 is compared with the list of wand IDs issued by the particular wand distributor. If the wand ID 1804 is validated, flow moves out the "Y" path to a function block 2308 where the message packet is appended with the wand ID 1804 and distributor routing address. Flow then moves to a decision block 2310 where the ARS 308 determines if any E-commerce information is to be associated with a particular wand ID 1804. If so, flow is out the "Y" path to a function block 2312 where the message packet is appended with the E-commerce routing string. The E-commerce routing string provides addressing for the E-commerce server 1618. Flow then moves to a function block 2314 where all message packets are returned back to the PC 302 for processing.

Referring back to decision block 2306, if the wand ID 1804 is determined to be invalid, flow moves out the "N" path and jumps forward to the input of decision block 2314, since the lack of a wand ID 1804 interrupts the link to any advertising provided by the E-commerce server 1618. At this point, the only information provided is the link to the advertiser server 312 for return of product information. Referring now to decision block 2310, if no E-commerce information is available, flow moves out the "N" path and jumps forward to the input of function block 2314 where the message packet back to the PC 302 contains only the URL of the advertiser server 312, the bar code information, the distributor server 1616 address and wand ID 1804 information.

Figure 24:
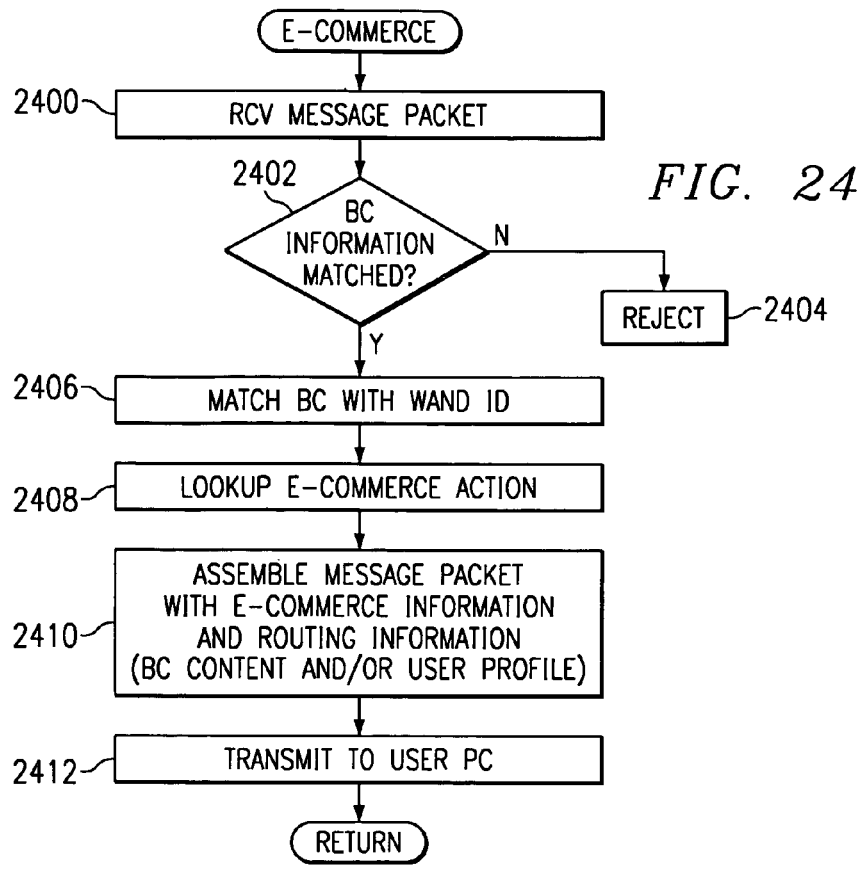
FIG. 24 illustrates a flowchart of the process performed at the E-commerce node.

Referring now to FIG. 24, there is illustrated a flowchart of the process performed at the E-commerce site. The E-commerce server 1618 receives the message packet from the user PC 302, as indicated in function block 2400, and decodes the packet to perform a match with the bar coded information. Moving on to a decision block 2402, if the match is unsuccessful, flow is out the "N" path to a function block 2404 where the match is rejected. A message may be returned to indicate that a problem occurred and the user may need to re-scan the product bar code 1606. If a successful match occurs, flow moves out the "Y" path to a function block 2406 where the wand ID 1804 is matched with the bar code product information. The bar coded information may be distributed to customers over a large geographic area. However, the wand 1606 may be coded for certain geographic areas. For example, a wand 1600 having an XXX ID may be restricted for sale in the Southwestern United States while a wand 1600 having a YYY ID may be sold only in the Northeast. In this way, geographic areas may be targeted with advertising more appealing to that particular area. Advertising returned to the user PC 302 may be focused further by obtaining a user profile when the software or wand 1600 are installed. In this way, advertising may be focused based upon the user profile. Therefore, flow moves to a function block 2408 to lookup the E-commerce action based upon the wand ID 1804 and the bar code information. Flow moves to a function block 2410 to assemble all the information into a packet for return to the user PC 302. The product information and/or user profile information may be returned. Flow is then to a function block 2412 where the message packet is transmitted.

Figure 25:
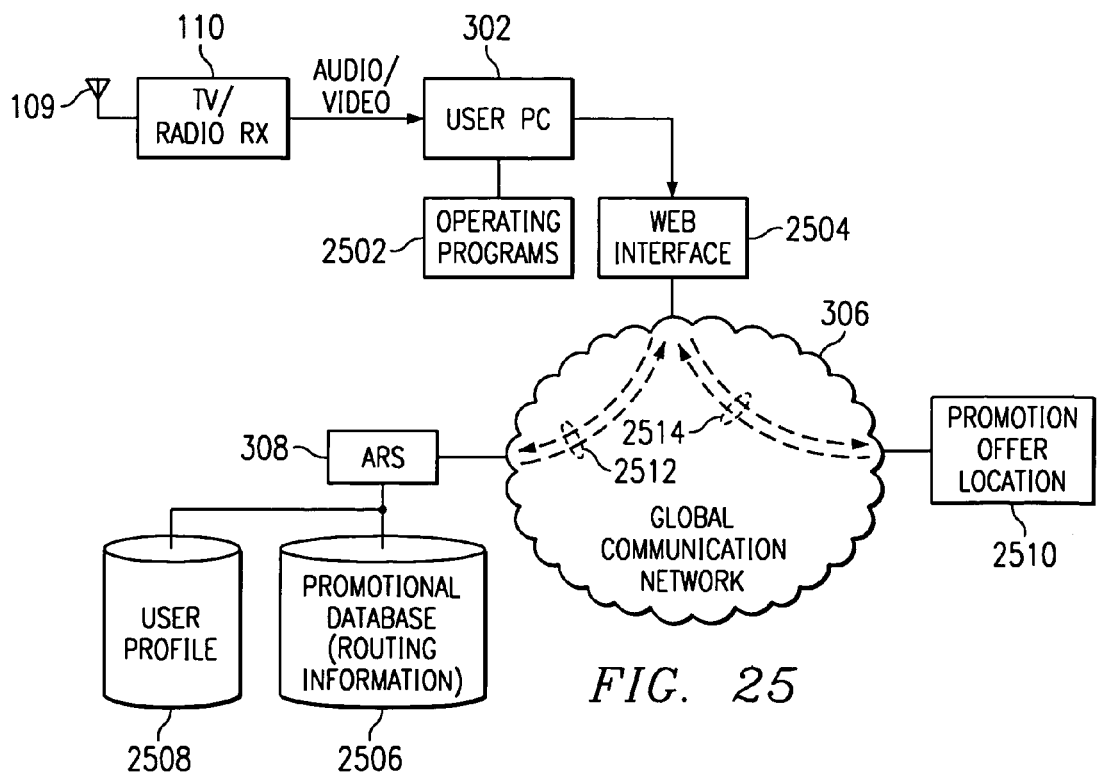
FIG. 25 illustrates a block diagram of the system for allowing promotional offers to be provided over the network.

Referring now to FIG. 25, there is illustrated a system for allowing an advertiser to offer a promotion over a broadcast system to a user utilizing the structure described hereinabove. From a general standpoint, this will allow the advertiser to provide over the broadcast channel, in the background, an audio or video indicia (or combination thereof) to a user which is sensed by the user PC 302 and then the user PC 302 interconnected with a defined location on the network 306 for interfacing with the advertiser to actually promote some offer over the network 306 utilizing the system described hereinabove. As described hereinabove, a broadcast signal is received by the receiver 110 which can be a television receiving a television broadcast, or even a radio. This will provide, in the case of the television, an audio and/or video output and, in the case of a radio, an audio output. This audio output is input to the user PC 302 by, for example, an audible connection via a speaker and microphone or by hard-wired connection. User PC 302 operates various programs for sensing the audio system, as set forth in an operating program region 2502, and also as described hereinabove. This operating program region basically contains the operating programs that are running in the background or the foreground. In the present disclosure, a program will be running in the background or foreground to continually sense any audible signals that are received. In the event that a tone or specific signal is received that is recognized by the background operating program (or foreground operating program) as being associated with an advertisement, this program will then cause the user PC 302 to interconnect with the network (also called the "web") 306 through a web interface 2504, which is similar to the modem 114 described hereinabove with respect to FIG. 1. This allows a web interface 2504 to interface with the network 306. In the present embodiment, the initial operation is performed by the operating program 2502 wherein a web browser is launched and the web browser utilized by the operating program to interface with locations on the network. However, it could be that the operating program in the background for sensing the audio and/or video signal does not require the web browser to interconnect with the network. It should be understood that this program could either interface directly with the network by directly interfacing with the TCP/IP gateway in the user PC 302, or utilize the web browser as the interface to the web 306.

Initially, the web 306 is accessed such that information regarding the received tone, i.e., the decoded tone itself, is transmitted to the ARS 308. In this embodiment, the ARS 308 will have a promotional database 2506 associated therewith and a user profile database 2508. As described hereinabove, the user profile database 2508 is created when the user initially receives the particular operating program that allows sensing of the audio input and assessment access to the web 306. This will require the user to input a particular profile, which profile is then stored in the user profile database 2508 and a unique user ID associated with user PC 302 via the operating program for transmission at a later time to the ARS 308. When the ARS 308 receives this user ID, it can be compared with corresponding user IDs in the user profile database 2508 (of which there should only be one) and then extract the user's profile information. This basically allows user profile information to be stored without requiring it to be constantly re-transmitted from the user PC 302. However, it could be stored at the user PC 302. The promotional database 2506 contains information regarding the decoded information from the broadcast which was received by the user PC 302 and has associated therewith routing information. Therefore, for each encoded tone that is transmitted by the broadcaster, there will be an associated decoded word or value in the database 2506 with certain information associated therewith. A minimum requirement is that there be routing information to allow the user PC 302 interface to the network 306 to interconnect with a promotion offer location 2510. However, there could be other information that is transmitted. This information is then, as described hereinabove, relayed back to the user PC 302. This connection between the user PC 302 and the ARS 308 is represented by interconnection path 2512 in the network 306.

After this information is returned to the user PC 302, the user PC 302 will utilize this routing information to interconnect the user PC with the promotion offer location 2510 to allow a bi-directional path, as represented by a path 2514 in the network 306. In addition to providing the routing information, the ARS 308 will also send back to the user PC 302 the user profile and any other information required by the promotion that would be stored in the promotional database 2506, and this will be assembled into a packet for transmission from the user PC 302 to the promotion offer location 2510 on the network 306. Note that the promotion offer location 2510 need not receive the code to understand what type of promotion was located. For example, it could be that the information returned to the user PC 302 for relay to the promotion offer location 2510 was a string of characters utilized by the browser consisting of domain name and subsequent instructions, which subsequent instructions would indicate to the promotion offer location 2510 certain actions that needed to be taken through HTML instructions which are conventional. These, of course, are provided by the operator of the promotion offer location 2510 to the operator of the ARS location 308 for storage in the promotional database 2506. Thus, when the particular unique information is received from the user PC 302, which was forwarded thereto by the broadcaster, this information will be associated with any information that the operator of the promotion offer location offered, i.e., that the promoter wants to have associated therewith. This association, of course, is what the ARS 308 utilized to assemble a relay string, this being the URL of the promotion offer location 2510 and various other information associated therewith, such as particular HML codes for use by the promotion offerer.

Figure 26:
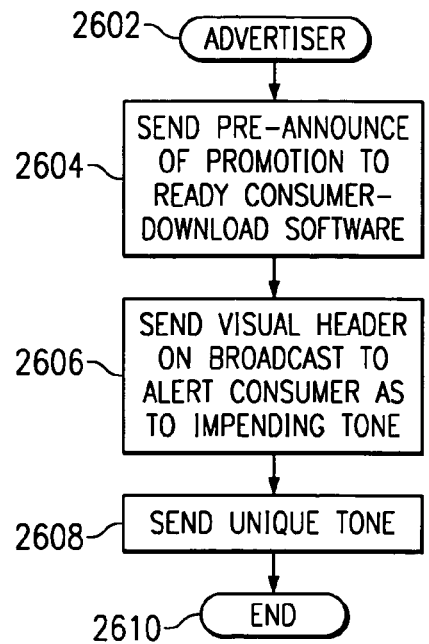
FIG. 26 illustrates a flowchart depicting the operation at the advertiser for initiating a promotional offer.

Referring now to FIG. 26, there is illustrated a flowchart depicting the generation of the unique tone by the broadcaster. This is initiated at a block 2602 and then proceeds to a block 2604 wherein a pre-announcement is sent of a promotion that is going to be offered by a promoter. The purpose of this is that the promoter would like to have as many individuals as possible join in the promotion. However, in order to recognize a tone or visual stimulus to a user, the user must have a PC running a particular proprietary software associated with the ARS 308 to provide the "listening" function. Therefore, this promotion can be provided to the user via the broadcast, either a short time before or even days before the actual promotion is offered. This is very similar to the situation wherein news programs advertise a newsworthy event and the reporting thereof on the "Eleven O'clock News," wherein the sum total of the advertisements for that news report far exceed the length of time of the actual news report, the pre-advertising luring viewers to the entire news report for the purpose of increasing viewership. Further, this allows the individual to, if they do not already possess the software, go to the web site for the ARS 308 or some other web site, and download the software. For example, the advertisement would indicate that "for software to access this promotion, go to www.softwareprovider.com to download the required software." Alternatively, the announcement may just be a way to ensure people do not walk away from television during an advertisement interruption in a program. At a later time, an actual visual header is sent to the individual via the broadcast to indicate that the stimulus is about to be sent, as indicated in a function block 2606. Typically, this will be some type of bouncing unique and recognizable "bug" that appears on one corner of the television set, which will be recognized by individuals as preceding a unique indicia of a network link. The program will then proceed to function block 2608 to send the unique tone or even a unique video signal in another embodiment, and into an End block 2610.

Figure 27:
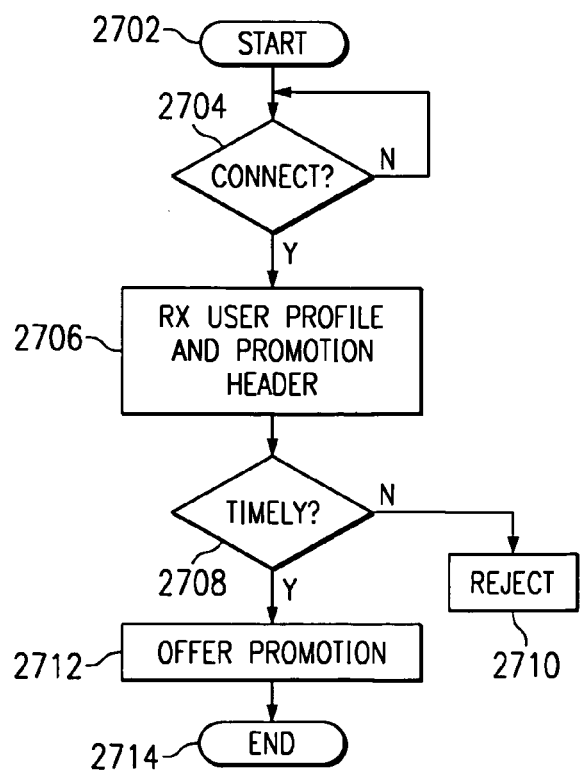
FIG. 27 illustrates the operation at the user's PC for interconnecting with the promotion.

Referring now to FIG. 27, there is illustrated a flowchart depicting the operation at the promotion offer location 2510.

The program is initiated at block 2702 and proceeds to a decision block 2704 to determine if an Internet connection has been made to a new user requesting information. This, as described hereinabove, is facilitated by going to the ARS 308, requesting routing information and then using this routing information to make the connection. Also as described hereinabove, this is facilitated by sending a user ID and the encoded information from the received stimulus to the ARS 308. The program would continue in a loop until the connection is made, at which time it will proceed to a function block 2706 to receive the user profile and promotion header information which was provided by the ARS 308 in the form of a relay. The program then flows to a decision block 2708 to determine if the information has been received in a timely manner. There are certain situations wherein a promotion must be timely to obtain the full effect of a promotion. This could be thwarted in a situation wherein an individual would record the program with the advertisement sections and then use this to stimulate his computer. Further, this tone could be used to continually log on for a promotion to obtain more than "one bite of the apple." Of course, in other situations, the promoter would welcome a request at any time and any number of requests from a single user. If it is not timely, the program will flow to a reject box 2710 and, if timely, the program will flow to function block 2712 to offer the promotion and then to an End block 2714.

Figure 28:
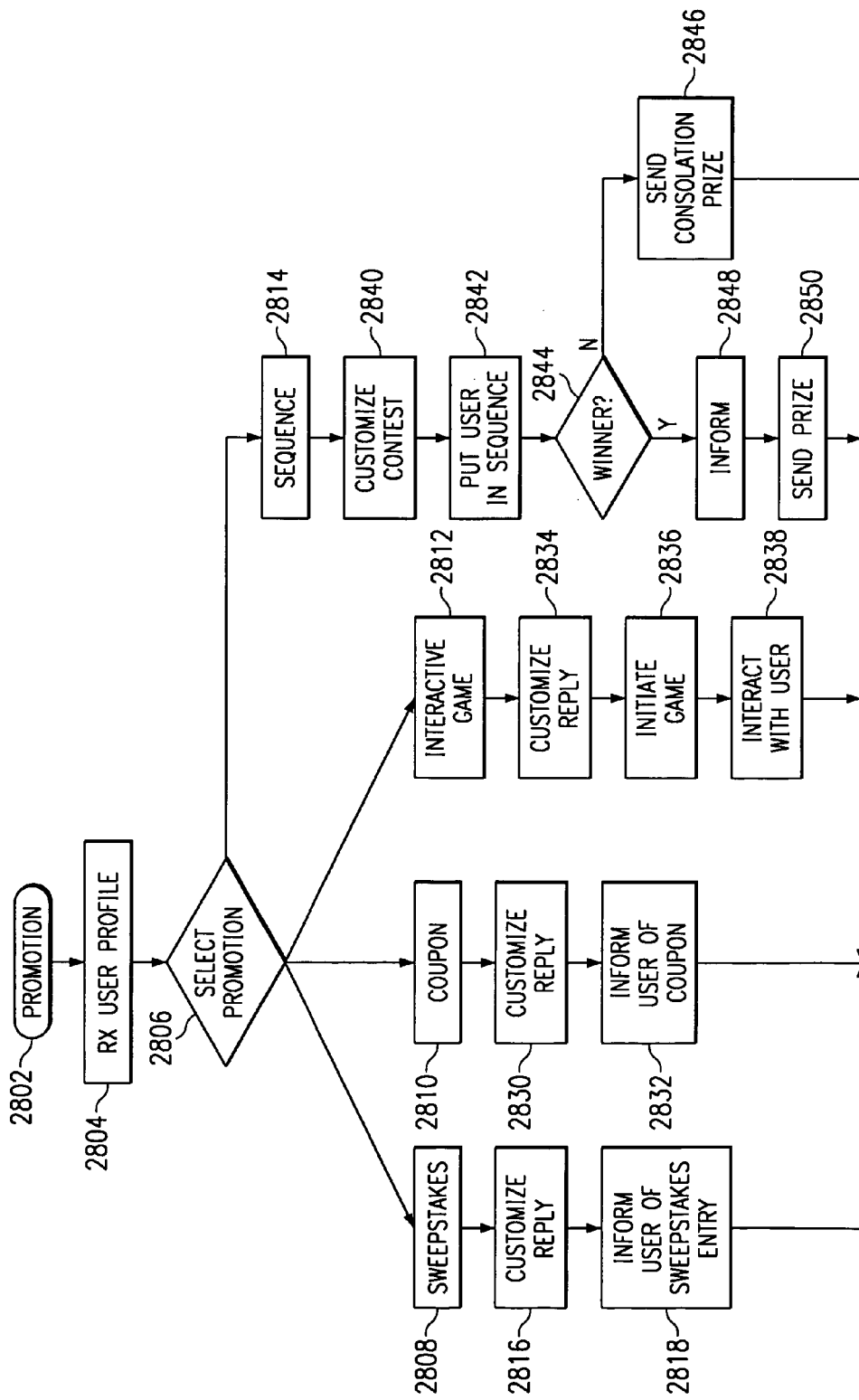
FIG. 28 illustrates a flowchart depicting the operation at the advertiser of completing the promotion after interfacing with the user.

Referring now to FIG. 28, there is illustrated a flowchart for the offer promotion operation at the location of the promoter, which initiated at a block 2802, then proceeds to function block 2804 wherein the user's profile is received and then to a multi-point decision block 2806 wherein the promotion is selected, or there could be a plurality of selections of different types of promotions offered by the same promoter. The type of promotion is determined by the header information forwarded to the promoter in conjunction with the information in the promotional database 2506. One type of promotion could be a sweepstakes represented in block 2808, wherein all individuals are entered into some type of selection process offering a single large prize, this being solely for receiving the profile information stored in the user profile database 2508. Note that this is usually the main desire of a sweepstakes provider, other than to link it to its web page to try and solicit the purchase of magazines or other articles. By the means of a user profile in the user profile database 2508, this is an important step to bypass. Another promotion could be an electronic coupon, represented in a block 2810. These are referred to typically as "E-coupons," which would provide some type of coupon to an individual. Another type could be an interactive game, as represented by a block 2812, which allows the user to interface in an interactive manner with the promoter's web site. Another promotion is a sequencing-type promotion, indicated by a block 2814, wherein the individual is placed into a sequence and it is the place in the sequence that may produce the reward.

With respect to the sweepstakes, once the sweepstakes promotion is selected, the program proceeds from the function block 2808 to a function block 2816, wherein a customized reply or interface will be provided to the particular user based upon the profile information received. As such, a certain individual indicating a preference for books may be put into a sweepstakes associated with books and an individual indicating a strong preference for sports may be put into a sweepstakes associated with sports prizes. This provides possibly more incentive for an individual to spend time at a particular site. The program then flows to function block 2818 wherein the user is informed of the sweepstakes entry and how the user will be contacted in the future. The program then flows to an End block 2820.

In the situation where the promotion is a coupon, the program will flow from block 2810 to a function block 2830 to generate a customized reply to the user based upon the user profile and the type of information to be presented to that particular user. It could be coupons for sporting events, associated with a strong sporting preference, or with literary events, associated with a strong literary preference. The program will then flow to function block 2832 wherein the user is informed of the coupon and how to exercise the coupon. This exercise may actually be a link to a book provider web site, wherein the user is actually provided a coupon on a web site. Further, the customized interface with the user could actually route that user, based upon preferences in the user profile, to a different web site to offer an electronic coupon. Once completed, the program flows to the End block 2820. Utilizing the interactive game, the program will flow from the function block 2812 to a function block 2834 wherein, again, the interface with the user is customized based upon preferences. A game of some type is initiated, as indicated by block 2836 and then the system interacts with the user, as indicated by function block 2838. The program, after completion of the interaction, will proceed to the End block 2820.

For the sequencing operation, this will first flow to a function block 2840 from function block 2814 to customize the contest in accordance with the user's profile, as described hereinabove. The user is in place in a sequence, as indicated by function block 2842 and then a determination is made as to whether the user is a winner, as indicated by decision block 2844. If not, the program will go to function block 2846 to send a consolation prize, then to End block 2820. However, if the user is a winner, he will be informed by block 2848 and then proceed to function block 2850 to send the prize, this being any number of incentives over the network, possibly in the form a credit or coupon, and then to the End block 2820. Although here are listed only four promotions, there can be any type of promotion that is offered in response to receiving the user profile and the actual connection with the user network via routing information proved by the ARS 308.

Although the preferred embodiment has been described in detail, it should be understood that various changes, substitutions and alterations can be made therein without departing from the spirit and scope of the invention as defined by the appended claims.

What is claimed is:

1. A method for transmitting a promotion offer to a user location on a network, comprising the steps of:
   receiving a preannouncement of a promotion offer at a user location indicating that a promotion offer will be provided in a broadcast;
   receiving an indication within the broadcast, at the user location, of an impending stimulus to be received at the user location;
   responsive to receiving the preannouncement, downloading by the user, software to the user location to allow receiving of the stimulus;
   by use of the downloaded software, receiving the stimulus from the broadcast directed to the user location, the stimulus having unique coded information encoded therein which unique coded information has no routing information contained therein;
   decoding, at the user location, the unique coded information from the stimulus;
   using the decoded information to determine over the network at a remote location on the network, routing information defining a unique network address that defines a promotion offer location on the network, which promotion offer location is operable to transmit a promotion offer automatically to the user location in response to being accessed according to the routing information, and also using the decoded information to determine information regarding the promotion offer;

receiving at the user location from the remote location the determined routing information and the determined information regarding the promotion offer;

interconnecting the user location with the promotion offer location on the network in accordance with the determined routing information;

in conjunction with the step of interconnecting to the promotion offer location with the unique network address, forwarding the determined information regarding the promotion to the promotion offer location from the user location;

by one or more computers, generating the promotion offer, in response to and after the step of interconnection, based upon the forwarded determined information regarding the promotion and based upon the timeliness of the interconnection between the user location and the promotion location;

providing a full effect of the promotion offer only after the interconnection has been determined to be timely; and transmitting the promotion offer over the network from the promotion location to the user location.

2. The method of claim 1, wherein the stimulus is an audio stimulus and wherein the unique coded information therein is digital information, and the step of decoding comprises:
receiving the audio stimulus, and decoding therefrom the digital information.

3. The method of claim 1, wherein the stimulus is a video stimulus and wherein the unique coded information therein is digital information, and the step of decoding comprises:
receiving the video stimulus, and decoding therefrom the digital information.

4. The method of claim 1, wherein the step of interconnecting forwards user profile information regarding the user at the user location to the promotion offer location and wherein the step of generating the promotion offer further includes basing it upon the user profile information received from the user.

5. A method for receiving a promotion offer at a user location on a network, comprising the steps of:
receiving a preannouncement of a promotion offer at a user location indicating that a promotion offer will be provided in a broadcast;
receiving an indication within the broadcast, at the user location, of an impending stimulus to be received at the user location;
responsive to receiving the pre announcement, downloading by the user, software to the user location to allow receiving of the stimulus;
by use of the downloaded software, receiving the stimulus from the broadcast directed to the user location, the stimulus having unique coded information encoded therein which unique coded information has no routing information contained therein;
decoding, at the user location, the unique coded information from the stimulus;
using the decoded information to determine over the network at a remote location on the network, routing information defining a unique network address that defines a promotion offer location on the network, which promotion offer location is operable to transmit a promotion offer automatically to the user location in response to being accessed according to the routing information, and also using the decoded information to determine information regarding the promotion offer;
receiving at the user location from the remote location the determined routing information and the determined information regarding the promotion offer;
interconnecting the user location with the promotion offer location on the network in accordance with the determined routing information;
in conjunction with the step of interconnecting to the promotion offer location with the unique network address, forwarding the determined information regarding the promotion to the promotion offer location from the user location;
by one or more computers, generating the promotion offer in response to and after the step of interconnecting based upon the forwarded determined information regarding the promotion and based upon the timeliness of the interconnection between the user location and the promotion location;
providing a full effect of the promotion offer only after the interconnection has been determined to be timely; and
receiving at the user location the promotion offer sent over the network from the promotion location.

6. The method of claim 5, wherein the stimulus is an audio stimulus and wherein the unique coded information therein is digital information, and the step of decoding comprises:
receiving the audio stimulus, and decoding therefrom the digital information.

7. The method of claim 5, wherein the stimulus is a video stimulus and wherein the unique coded information therein is digital information, and the step of decoding comprises:
receiving the video stimulus, and decoding therefrom the digital information.

8. The method of claim 5, wherein the step of interconnecting forwards user profile information regarding the user at the user location to the promotion offer location and wherein the step of generating the promotion offer further includes basing it upon the user profile information received from the user.

* * * * *